US011215831B2

(12) United States Patent
Nishizawa

(10) Patent No.: US 11,215,831 B2
(45) Date of Patent: Jan. 4, 2022

(54) TRANSMISSIVE HEAD MOUNTED DISPLAY APPARATUS, SUPPORT SYSTEM, DISPLAY CONTROL METHOD, AND COMPUTER PROGRAM

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/387,710

(22) Filed: Apr. 18, 2019

(65) Prior Publication Data

US 2019/0324275 A1  Oct. 24, 2019

(30) Foreign Application Priority Data

Apr. 19, 2018  (JP) .............................. JP2018-080322

(51) Int. Cl.
| | | |
|---|---|---|
| *G06F 3/01* | (2006.01) | |
| *G02B 27/01* | (2006.01) | |
| *G02B 27/09* | (2006.01) | |
| *G06F 9/30* | (2018.01) | |

(52) U.S. Cl.
CPC ..... *G02B 27/0172* (2013.01); *G02B 27/0961* (2013.01); *G06F 3/013* (2013.01); *G06F 9/3004* (2013.01)

(58) Field of Classification Search
CPC ............ G02B 27/0172; G02B 27/0961; G02B 2027/014; G02B 2027/0138; G02B 2027/0134; G02B 2027/0187; G02B 2027/0178; G02B 27/017; G06F 9/3004; G06F 3/013; G06F 3/0304; G06F 3/011; G06K 9/00671

See application file for complete search history.

(56) References Cited

U.S. PATENT DOCUMENTS

| 10,311,646 B1* | 6/2019 | Wurmfeld .......... G06K 9/00208 |
|---|---|---|
| 2009/0099898 A1* | 4/2009 | Ehrman ................ G06Q 10/06 705/7.15 |
| 2013/0083062 A1* | 4/2013 | Geisner ............... G02B 27/017 345/633 |

(Continued)

FOREIGN PATENT DOCUMENTS

| CN | 107911688 | 4/2018 |
|---|---|---|
| JP | 2008-113317 A | 5/2008 |
| JP | 2010-139589 A | 6/2010 |

*Primary Examiner* — Lunyi Lao
*Assistant Examiner* — Jarurat Suteerawongsa
(74) *Attorney, Agent, or Firm* — JCIPRNET

(57) ABSTRACT

A transmissive head mounted display apparatus includes an image display unit configured to transmit an external scene and display an image of a display target viewable with the external scene, an imaging unit, a target identifying unit configured to identify, from a captured image captured by the imaging unit, a target of a task predetermined as a task that a user of the transmissive head mounted display apparatus needs to perform, a task occurrence determination unit configured to determine, based on a state of the target in the captured image, whether the task has occurred or not, and a display controller configured to cause the image display unit to display related information relating to the task when the task is determined to have occurred.

12 Claims, 19 Drawing Sheets

(56) References Cited

U.S. PATENT DOCUMENTS

| | | | |
|---|---|---|---|
| 2014/0081691 A1* | 3/2014 | Wendell | G06Q 10/063114 |
| | | | 705/7.15 |
| 2014/0354529 A1* | 12/2014 | Laughlin | G06F 3/011 |
| | | | 345/156 |
| 2015/0156803 A1* | 6/2015 | Ballard | G06F 1/163 |
| | | | 455/422.1 |
| 2016/0077623 A1* | 3/2016 | Sherman | G06F 19/3418 |
| | | | 345/156 |
| 2016/0300178 A1* | 10/2016 | Perry | G06Q 10/063116 |
| 2017/0193302 A1* | 7/2017 | Mullins | G09G 5/006 |
| 2018/0122162 A1* | 5/2018 | Jayanthi | G01C 21/343 |
| 2018/0268219 A1* | 9/2018 | Miller | G06T 19/006 |

\* cited by examiner

ANOTHER EXEMPLARY EMBODIMENT 1

| PLACE TO PERFORM TASK | TARGET OF TASK | STATE OF TARGET | RELATED INFORMATION |
|---|---|---|---|
| FOOTBALL STADIUM (AT ENTRANCE) | AUDIENCE | LOOKING FOR SOMETHING | GUIDANCE TO RESERVED SEAT |
| FOOTBALL STADIUM (AT HALF TIME) | AUDIENCE | LOOKING FOR SOMETHING | GUIDANCE TO RESTROOM |
| DINING ROOM | USER AT CUSTOMER SERVICE AREA | CLEARING AWAY PLATES | GUIDANCE TO SERVICE HATCH FOR PLATES |
| DINING ROOM | USER AT CUSTOMER SERVICE AREA | CLEARING AWAY PLATES | HOW TO WASH PLATES, GUIDANCE TO PLATE STORAGE AREA |
| EATING ESTABLISHMENT | CUSTOMER AT ENTRANCE | THE NUMBER OF CUSTOMERS | GUIDANCE TO UNOCCUPIED TABLE |
| ELECTRICAL APPLIANCE STORE | CUSTOMER AT SALES FLOOR FOR AIR CONDITIONER | LOOKING AT COMMERCIAL PRODUCT | GUIDANCE FOR SELLING POINT OF TARGET COMMERCIAL PRODUCT |
| ELECTRICAL APPLIANCE STORE | CUSTOMER AT SALES FLOOR FOR AIR CONDITIONER | LOOKING AT COMMERCIAL PRODUCT | INQUIRY POINT TO CUSTOMER (PRICE, ROOM SIZE, ELECTRICITY COST, AND THE LIKE) |
| CRAM SCHOOL | STUDENT | HAND STOPS ON NOTEBOOK | CLUE FOR STUDENT TO BE INSTRUCTED (HOW TO SOLVE PROBLEM, OR THE LIKE) |
| BASEBALL STADIUM | AUDIENCE | LOOKING AROUND WITH BEER IN HAND | GUIDANCE FOR SNACKS (RECOMMEND POPCORN, OR THE LIKE) |
| DEPARTMENT STORE | CUSTOMER AT SALES FLOOR FOR CLOTHES | LOOKING FOR SOMETHING WHILE HOLDING COMMERCIAL PRODUCT AND WALLET IN HAND | GUIDANCE TO CASHIER, GUIDANCE TO FITTING ROOM |
| MATSUMOTO CASTLE | VISITOR AT OTE GATE | READING MAP, MOVING DIRECTION | GUIDANCE TO ADMISSION TICKET COUNTER |

FIG. 19

TRANSMISSIVE HEAD MOUNTED DISPLAY APPARATUS, SUPPORT SYSTEM, DISPLAY CONTROL METHOD, AND COMPUTER PROGRAM

The present application is based on and claims priority from JP Application Serial Number 2018-080322, filed Apr. 19, 2018, the disclosure of which is hereby incorporated by reference herein in its entirety.

BACKGROUND

1. Technical Field

The present disclosure relates to operation support utilizing a transmissive head mounted display apparatus.

2. Related Art

As a head-mounted display apparatus (Head Mounted Display (HMD)) mounted on a head of a user to display images and the like within the visual field area of a user, a transmissive head mounted display apparatus has been known, allowing an external scene to be transmitted and visually recognized along with a display image when mounted. Various operation support techniques utilizing a transmissive head-mounted display apparatus have been proposed. For example, JP-A-2010-139589 proposes a technique in which each of a worker sorting commercial products and a manager of the worker mounts an HMD, commercial product information such as a commercial product name is displayed on a display unit of the HMD mounted by the worker, and an image in which a visibility space of the worker is captured is displayed on a display unit of the HMD mounted by the manager, so that efficiency of each work is improved. Additionally, for example, JP-A-2008-113317 discloses a technique in which a manager can control orientation of a camera and a position of a zoom lens of an HMD mounted by a worker at a remote location, and give the worker instructions for work while checking an image captured by the camera.

However, in a transmissive head mounted display device, it is a fact that sufficient ingenuity has not been made for operation support in a case where a plurality of workers works while mutually cooperating. For example, in the respective techniques described in JP-A-2010-139589 and JP-A-2008-113317, nothing is considered for a case where a plurality of workers exists.

SUMMARY

According to an exemplary embodiment of the present disclosure, a transmissive head mounted display apparatus is provided. This transmissive head mounted display apparatus includes an image display unit configured to transmit an external scene and display an image of a display target viewable with the external scene, an imaging unit, a target identifying unit configured to identify, from a captured image captured by the imaging unit, a target of a task predetermined as a task that a user of the transmissive head mounted display apparatus needs to perform, a task occurrence determination unit configured to determine, based on a state of the target in the captured image, whether the task occurs or not, and a display controller configured to cause the image display unit to display related information relating to the task when the task is determined to have occurred.

BRIEF DESCRIPTION OF THE DRAWINGS

FIG. 19 is an explanatory diagram illustrating an example of task data.

DESCRIPTION OF EXEMPLARY EMBODIMENTS

A. First Exemplary Embodiment

A1. Configuration of Operation Support System

Figure 1:
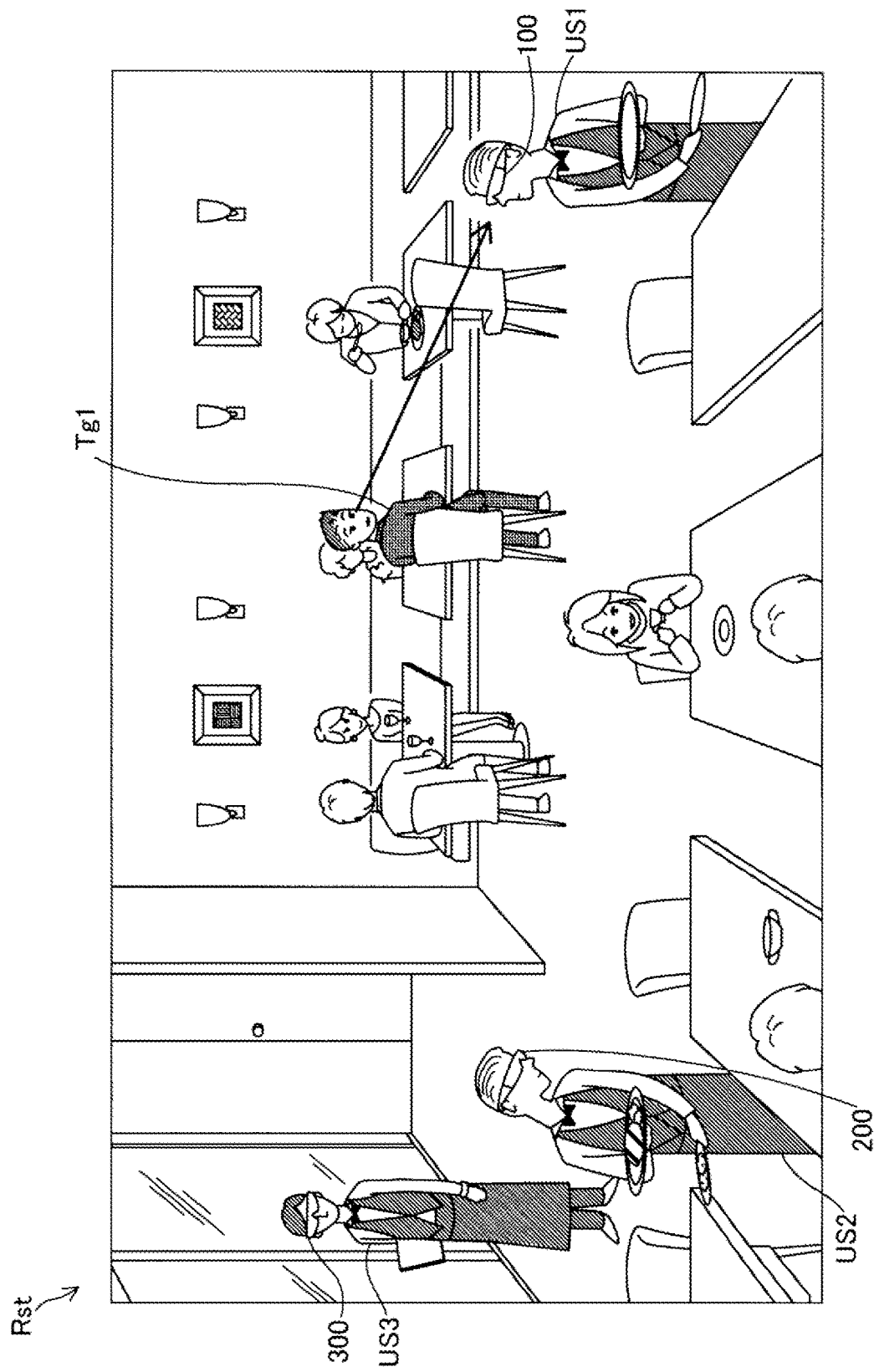
FIG. 1 is an explanatory diagram schematically illustrating a state where an operation support system runs as a first exemplary embodiment of the present disclosure.

FIG. 1 is an explanatory diagram schematically illustrating a state where an operation support system runs as a first exemplary embodiment of the present disclosure. In an eating establishment such as a restaurant, while each of a plurality of hall staffs wears a transmissive head mounted display apparatus described later and performs staff operations, the operation support system supports mutual operations among the hall staffs, according to states of the mutual operations. For example, as illustrated in FIG. 1, in an eating establishment Rst, a first restaurant staff US1 wears a transmissive head mounted display apparatus 100 and is taking plates away. A second restaurant staff US2 wears a transmissive head mounted display apparatus 200 and is serving dishes. A third restaurant staff US3 wears a transmissive head mounted display apparatus 300 and is walking with a menu.

Additionally, each of a plurality of customers is having a meal, talking, or the like, in the eating establishment Rst. Among the plurality of customers, a customer Tg1 is looking at the first restaurant staff US1, and is going to call the first restaurant staff US1. However, the first restaurant staff US1 may not notice that the customer Tg1 is looking at the first restaurant staff US1, and service for the customer Tg1 may be delayed.

Thus, in each of the transmissive head mounted display apparatuses 100, 200, and 300 in the operation support system in the present exemplary embodiment, when operation support processing described later is performed, information such as occurrence of an operation of dealing with the customer Tg1 is shared among the restaurant staffs US1, US2, and US3, a performer of the operation is determined according to respective operational load conditions of the restaurant staffs US1, US2, and US3, and the determined performer is allowed to perform the operation. Detailed descriptions of the operation support processing will be described later, and firstly, respective configurations of the transmissive head mounted display apparatuses 100, 200, and 300 will be described. Note that, in the following descriptions, the restaurant staffs US1, US2, and US3 are referred to as users US1, US2, and US3 respectively, in some cases.

A2. Configuration of Transmissive Head Mounted Display Apparatus

Figure 2:
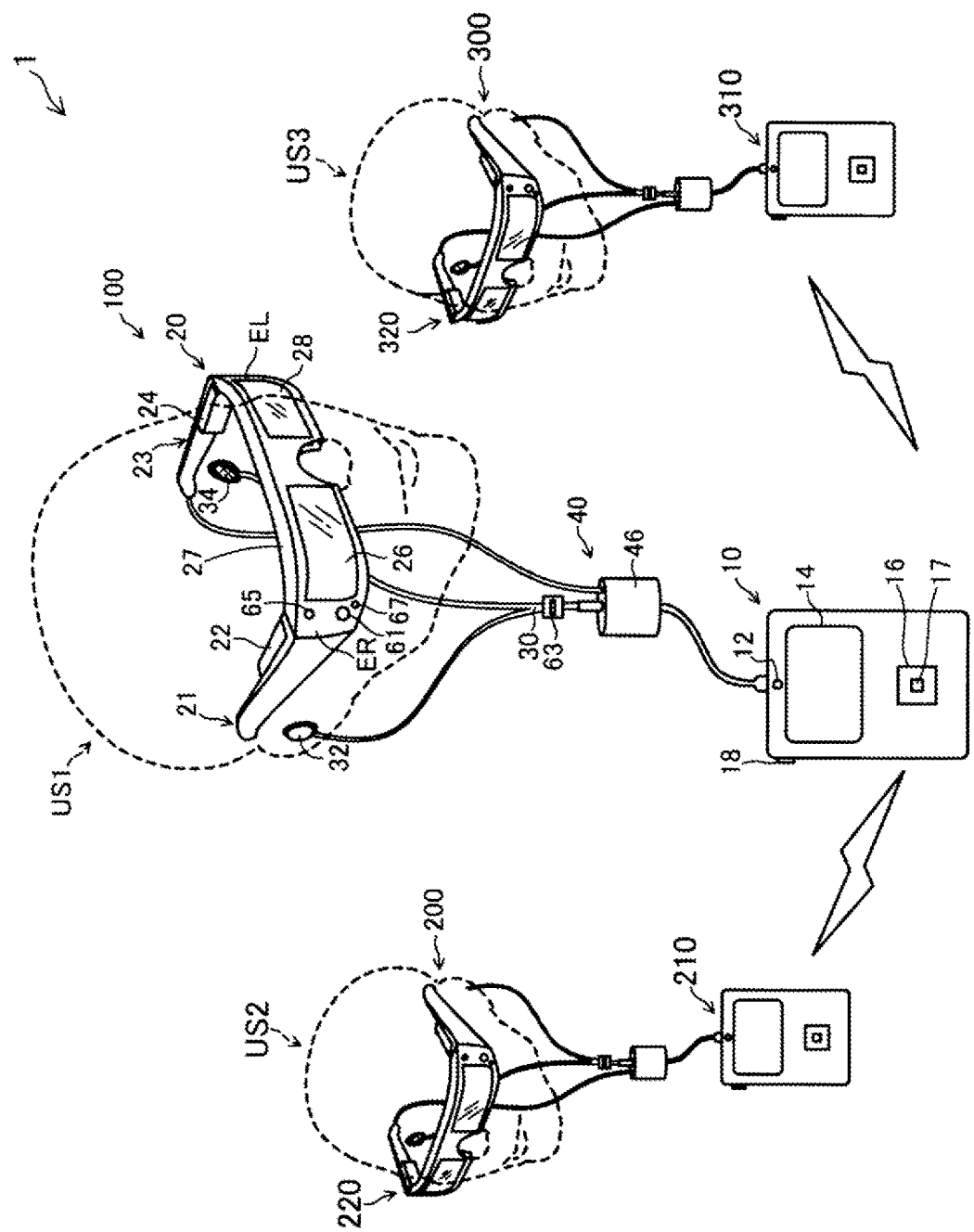
FIG. 2 is an explanatory diagram illustrating a schematic configuration of the operation support system and a transmissive head mounted display apparatus.

FIG. 2 is an explanatory diagram illustrating a schematic configuration of the operation support system and the transmissive head mounted display apparatus. In the present exemplary embodiment, an operation support system 1 includes the three transmissive head mounted display apparatuses 100, 200, and 300. Each of the transmissive head mounted display apparatuses 100, 200, and 300 is a display device to be worn on a head of the user and is also referred to as a Head Mounted Display (HMD). Each of the HMDs 100, 200, and 300 is a see-through type (transmissive) head mounted display apparatus that provides an image appearing in an external scene visually recognized through glasses.

The first HMD 100 includes a first image display unit 20 configured to allow the first user US1 to visually recognize images, and a first control device (controller) 10 configured to control the first image display unit 20. Each of the second HMD 200 and the third HMD 300 has a similar configuration to that of the first HMD 100. Accordingly, in FIG. 2, parts of respective configurations of the second HMD 200 and the third HMD 300 are not given reference signs. Further, the three HMDs 100, 200, and 300 are wirelessly connected with each other via a wireless communication unit 117 described later.

The first image display unit 20 is a head-mounted body to be worn by the first user US1 on the head and has an eyeglasses-like shape in the present exemplary embodiment. The first image display unit 20 includes a support body including a right holding part 21, a left holding part 23, and a front frame 27 and further includes, on the support body, a right display unit 22, a left display unit 24, a right light-guiding plate 26, and a left light-guiding plate 28.

The right holding part 21 and the left holding part 23 extend rearward from each of both ends of the front frame 27 to hold the first image display unit 20 on the head of a user in a manner similar to the temples of a pair of eyeglasses. Here, one of both the ends of the front frame 27 located on the right side of the user in a state where the user wears the first image display unit 20 is referred to as an end ER, and the other end located on the left side of the user in a state where the user wears the first image display unit 20 is referred to as an end EL. The right holding part 21 is provided to extend from the end ER of the front frame 27 to a position corresponding to the right side head part of the user when the user wears the first image display unit 20. The left holding part 23 is provided to extend from the end EL of the front frame 27 to a position corresponding to the left side head part of the user when the first user US1 wears the first image display unit 20.

The right light-guiding plate 26 and the left light-guiding plate 28 are provided in the front frame 27. The right light-guiding plate 26 is positioned in front of the right eye of the first user US1, when the first user US1 wears the first image display unit 20, to allow the right eye to visually recognize an image. The left light-guiding plate 28 is positioned in front of the left eye of the first user US1, when the user wears the first image display unit 20, to allow the left eye to visually recognize an image.

The front frame 27 has a shape connecting an end of the right light-guiding plate 26 and an end of the left light-guiding plate 28 with each other. The position of the connection corresponds to a position between eyebrows of the first user US1 when the user wears the first image display unit 20. The front frame 27 may include a nose pad portion that is provided at the position of the connection between the right light-guiding plate 26 and the left light-guiding plate 28, and that is in contact with the nose of the first user US1 when the user wears the first image display unit 20. In this case, the nose pad portion, the right holding part 21, and the left holding part 23 allow the first image display unit 20 to be held on the head of the first user US1. A belt may also be attached to the right holding part 21 and the left holding part 23 that fits to the back of the head of the first user US1 when the first user US1 wears the first image display unit 20. In this case, the belt allows the first image display unit 20 to be firmly held on the head of the first user US1.

The right display unit 22 is configured to display images on the right light-guiding plate 26. The right display unit 22 is provided on the right holding part 21 and lies adjacent to the right side head part of the first user US1 when the first user US1 wears the first image display unit 20. The left display unit 24 is configured to display images on the left light-guiding plate 28. The left display unit 24 is provided on the left holding part 23 and lies adjacent to the left side head part of the first user US1 when the first user US1 wears the first image display unit 20.

The right light-guiding plate 26 and the left light-guiding plate 28 according to the present exemplary embodiment are optical parts (e.g., prisms) formed of a light transmission-type resin or the like, and are configured to guide imaging light output by the right display unit 22 and the left display unit 24 to the eyes of the first user US1. Surfaces of the right light-guiding plate 26 and the left light-guiding plate 28 may be provided with dimmer plates. The dimmer plates are thin-plate optical elements having a different transmittance for a different wavelength region of light, and function as so-called wavelength filters. The dimmer plates are arranged to cover a surface of the front frame 27 (a surface opposite to a surface facing the eyes of the first user US1), for example.

Appropriate selection of an optical property of the dimmer plates allows the transmittance of light in a desired wavelength region, such as visible light, infrared light, and ultraviolet light to be adjusted, and allows the amount of outside light entering the right light-guiding plate 26 and the left light-guiding plate 28 from the outside and passing through the right light-guiding plate 26 and the left light-guiding plate 28 to be adjusted.

The first image display unit 20 guides imaging light generated by the right display unit 22 and the left display unit 24 to the right light-guiding plate 26 and the left light-guiding plate 28, respectively, to allow the first user US1 to visually recognize, by the imaging light, an image (Augmented Reality (AR) image) along with an external scene visually recognized through the first image display unit 20 (this is also referred to as "display an image"). In a case where the outside light traveling from the front of the first user US1 passes through the right light-guiding plate 26 and the left light-guiding plate 28, and enters the eyes of the first user US1, the imaging light forming an image and the outside light enter the eyes of the first user US1. The visibility of images visually recognized by the first user US1 can be affected by the intensity of the outside light.

As such, the visibility of images may thus be adjusted, for example, by mounting dimmer plates on the front frame 27 and by appropriately selecting or adjusting the optical properties of the dimmer plates. In a typical example, dimmer plates may be selected to have light transmissivity to allow the first user US1 wearing the first HMD 100 to visually recognize at least an external scene. The visibility of images may also be improved by suppressing sunlight. The use of the dimmer plates is also expected to be effective in protecting the right light-guiding plate 26 and the left light-guiding plate 28 to prevent, for example, damage and adhesion of dust to the right light-guiding plate 26 and the left light-guiding plate 28. The dimmer plates may be removably attached to the front frame 27 or each of the right light-guiding plate 26 and the left light-guiding plate 28. Alternatively, different types of removable dimmer plates may be provided for replacement, or alternatively the dimmer plates may be omitted.

A camera 61 is arranged on the front frame 27 of the first image display unit 20. The camera 61 is provided on a front surface of the front frame 27 and positioned so that the camera 61 does not block the outside light passing through the right light-guiding plate 26 and the left light-guiding plate 28. In the example in FIG. 2, the camera 61 is arranged on the end ER of the front frame 27. The camera 61 may be arranged on the end EL of the front frame 27 or at the connection between the right light-guiding plate 26 and the left light-guiding plate 28.

The camera 61 is a digital camera including an imaging lens, and an imaging element such as a charge-coupled device (CCD) and a complementary metal oxide semiconductor (CMOS). The camera 61 according to the present exemplary embodiment is a monocular camera. However, a stereo camera may be adopted. The camera 61 is configured to capture an image of at least part of an external scene (real space) in a front direction of the first HMD 100, in other words, in a direction of the field of view visually recognized by the first user US1 when the first user US1 wears the first image display unit 20. In other words, the camera 61 is configured to capture an image in a range overlapping with the field of view of the first user US1 or an image in the direction of the field of view of the first user US1, i.e., an image in a direction visually recognized by the user. An angle of view of the camera 61 can be appropriately set. In the present exemplary embodiment, a size of the angle of view of the camera 61 is set to allow the camera 61 to capture an image over the entire field of view that is visually recognizable to the first user US1 through the right light-guiding plate 26 and the left light-guiding plate 28. The camera 61 is controlled by a first control function unit 150 (FIG. 7) to capture an image and output the data of the captured image to the first control function unit 150.

The first HMD 100 may include a distance measurement sensor configured to detect a distance to a target object to be measured located in a predetermined measurement direction. The distance measurement sensor may be arranged at the connection between the right light-guiding plate 26 and the left light-guiding plate 28 of the front frame 27, for example. The measurement direction of the distance measurement sensor may be the front direction of the first HMD 100 (a direction overlapping with an imaging direction of the camera 61). The distance measurement sensor may include, for example, a light emitting part, such as a LED or a laser diode, and a light-receiving unit configured to receive light reflected by the target object to be measured. In this case, a distance is determined by a triangulation process or a distance measurement process based on a time difference. The distance measurement sensor may include, for example, a transmission part configured to transmit ultrasonic waves and a reception part configured to receive the ultrasonic waves reflected by a target object to be measured. In this case, a distance is determined by the distance measurement process based on the time difference. Like the camera 61, the distance measurement sensor measures a distance in accordance with an instruction from the first control function unit 150 and outputs the result of the detection to the first control function unit 150.

Figure 3:
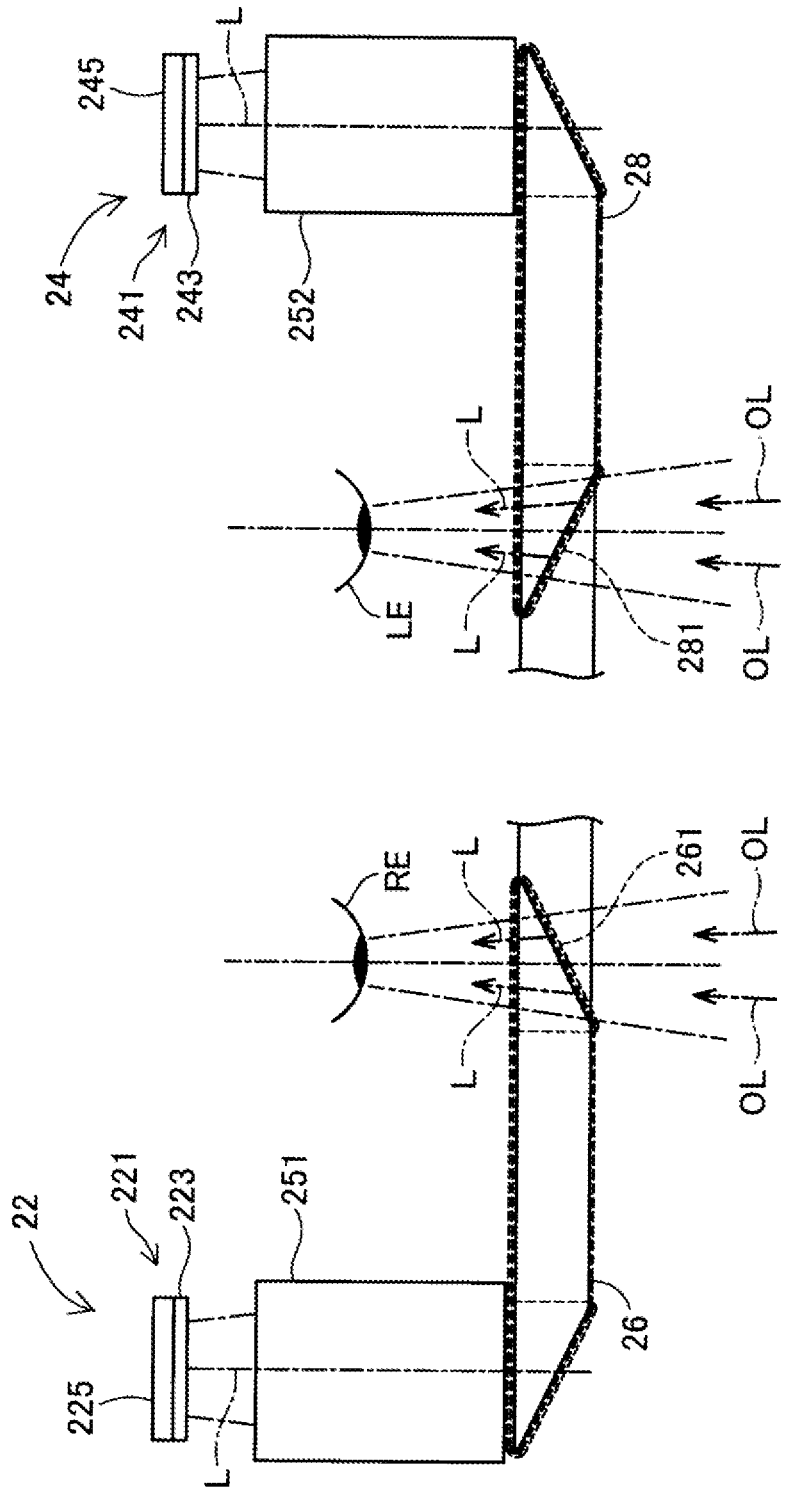
FIG. 3 is a main part plan view illustrating a configuration of an optical system included in a first image display unit.

FIG. 3 is a main part plan view illustrating a configuration of an optical system included in the first image display unit 20. For the convenience of description, FIG. 3 illustrates the right eye RE and left eye LE of the first user US1. As illustrated in FIG. 3, the right display unit 22 and the left display unit 24 are arranged symmetrically on the right- and left-hand sides.

To allow the right eye RE to visually recognize an image (AR image), the right display unit 22 includes an organic light emitting diode (OLED) unit 221 and a right optical system 251. The OLED unit 221 is configured to emit imaging light. The right optical system 251 includes a lens group and the like, and is configured to guide, to the right light-guiding plate 26, imaging light L emitted by the OLED unit 221.

The OLED unit 221 includes an OLED panel 223 and an OLED drive circuit 225 configured to drive the OLED panel 223. The OLED panel 223 is a light emission type display panel including light-emitting devices configured to emit red (R) color light, green (G) color light, or blue (B) color light by organic electro-luminescence. The OLED panel 223 includes a plurality of pixels arranged in a matrix, each of the plurality of pixels including one element of R, one element of G, and one element of B.

The OLED drive circuit 225 is controlled by the first control function unit 150 (FIG. 7), which will be described later, to select and power the light-emitting devices included in the OLED panel 223 to cause the light-emitting devices to emit light. The OLED drive circuit 225 is secured by bonding or the like, for example, onto a rear face of the OLED panel 223, i.e., back of a light-emitting surface. The OLED drive circuit 225 may include, for example, a semiconductor device configured to drive the OLED panel 223, and may be mounted onto a substrate secured to the rear face of the OLED panel 223. A temperature sensor 217 (FIG. 6) described below is mounted on the substrate. The OLED panel 223 may have a configuration in which light-emitting devices that emit white color light are arranged in a matrix and color filters that correspond to the R color, the G color, or the B color are disposed over the light-emitting elements. The OLED panel 223 may have a WRGB configuration including light-emitting devices configured to emit white (W) color light, in addition to light-emitting devices configured to emit R color light, G color light, or B color light.

The right optical system 251 includes a collimate lens configured to collimate the imaging light L emitted from the OLED panel 223. The imaging light L collimated by the collimate lens enters the right light-guiding plate 26. In an optical path configured to guide light inside the right light-guiding plate 26, a plurality of reflective faces configured to reflect the imaging light L is formed. The imaging light L is reflected a plurality of times inside the right light-guiding plate 26 and then, is guided to the right eye RE side. In the right light-guiding plate 26, a half mirror 261 (reflective face) located in front of the right eye RE is formed. The imaging light L reflected by the half mirror 261 is emitted from the right light-guiding plate 26 to the right eye RE. The imaging light L forms an image on the retina of the right eye RE to allow the first user US1 to visually recognize the image.

To allow the left eye LE to visually recognize an image (AR image), the left display unit 24 includes an OLED unit 241 and a left optical system 252. The OLED unit 241 is configured to emit imaging light. The left optical system 252 includes a lens group and the like, and is configured to guide, to the left light-guiding plate 28, imaging light L emitted by the OLED unit 241. The OLED unit 241 includes an OLED panel 243 and an OLED drive circuit 245 configured to drive the OLED panel 243. For further details, the OLED unit 241, the OLED panel 243, and the OLED drive circuit 245 are the same as the OLED unit 221, the OLED panel 223, and the OLED drive circuit 225, respectively. A temperature sensor 239 (FIG. 6) is mounted on a substrate secured to a rear face of the OLED panel 243. For further details, the left optical system 252 is the same as the right optical system 251 described above.

According to the configuration described above, the first HMD 100 may serve as a see-through display device. Namely, the imaging light L reflected by the half mirror 261 and outside light OL having passed through the right light-guiding plate 26 enter the right eye RE of the first user US1. The imaging light L reflected by the half mirror 281 and outside light OL having passed through the left light-guiding plate 28 enter the left eye LE of the first user US1. In this manner, the first HMD 100 allows the imaging light L of the internally processed image and the outside light OL to enter the eyes of the first user US1 in an overlapped manner. As a result, the first user US1 can view an external scene (real world) through the right light-guiding plate 26 and the left light-guiding plate 28 and also can visually recognize a virtual image (virtual image or AR image) formed by the imaging light L overlapping with the external scene.

The right optical system 251 and the right light-guiding plate 26 are also collectively referred to as a "right light-guiding unit" and the left optical system 252 and the left light-guiding plate 28 are also collectively referred to as a "left light-guiding unit". Configurations of the right light-guiding unit and the left light-guiding unit are not limited to the example described above, and any desired configuration may be adopted as long as imaging light forms an image in front of the eyes of the first user US1. For example, diffraction gratings or translucent reflective films may be used for the right light-guiding unit and the left light-guiding unit.

In FIG. 2, the first control device 10 and the first image display unit 20 are connected together via a connection cable 40. The connection cable 40 is removably connected to a connector provided in a lower portion of the first control device 10 and connects to various circuits inside the first image display unit 20 through a tip of the left holding part 23. The connection cable 40 includes a metal cable or an optical fiber cable through which digital data is transmitted. The connection cable 40 may further include a metal cable through which analog data is transmitted. A connector 46 is provided in the middle of the connection cable 40.

The connector 46 is a jack used to couple a stereo mini-plug. The connector 46 and the first control device 10 are coupled to each other with a line configured to transmit analog sound signals, for example. In the example of the present exemplary embodiment illustrated in FIG. 2, the connector 46 connects to a right earphone 32 and a left earphone 34 constituting a stereo headphone and to a headset 30 including a microphone 63.

Figure 6:
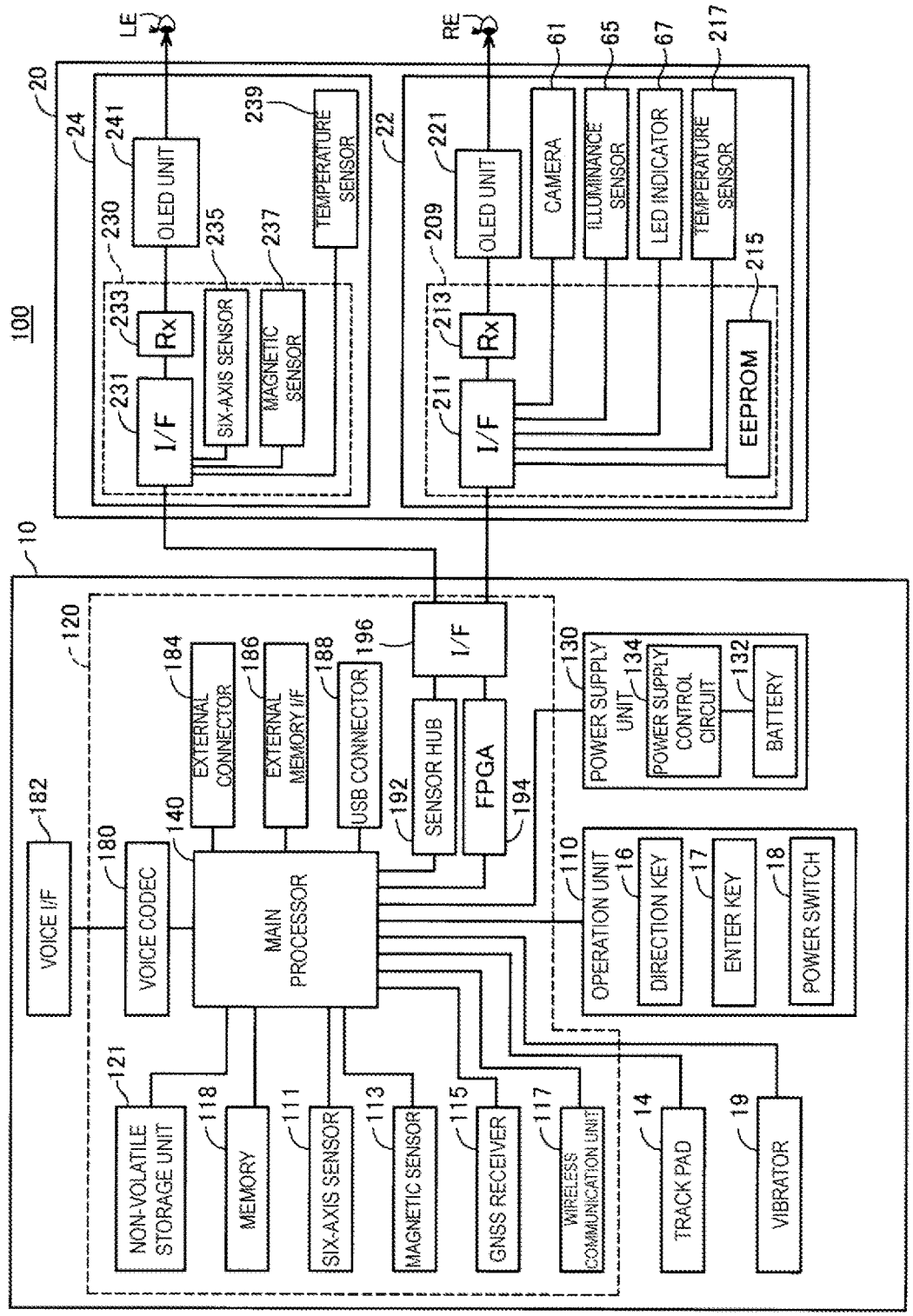
FIG. 6 is a functional block diagram illustrating a configuration of an HMD.

As illustrated in FIG. 2, for example, the microphone 63 is arranged such that a sound collector of the microphone 63 faces in a line-of-sight direction of the first user US1. The microphone 63 is configured to collect voice and output voice signals to a voice interface 182 (FIG. 6). The microphone 63 may be a monaural microphone or a stereo microphone, or may be a directional microphone or a non-directional microphone.

The first control device 10 is used to control the first HMD 100. The first control device 10 includes an illumination part 12, a track pad 14, a direction key 16, an enter key 17, and a power switch 18. The illumination part 12 is configured to inform the user of an operation-state of the first HMD 100 (e.g., power ON/OFF) with its light-emitting mode. The illumination part 12 may be, for example, light-emitting diodes (LEDs).

The track pad 14 is configured to detect a touch operation on an operation face of the track pad 14 to output a signal corresponding to what is detected. Any various track pads, such as an electrostatic-type track pad, a pressure detection-type track pad, and an optical track pad may be adopted as the track pad 14. The direction key 16 is configured to detect a push operation onto any of keys corresponding to up, down, right and left directions to output a signal corresponding to what is detected. The enter key 17 is configured to detect a push operation to output a signal for determining the operation performed on the first control device 10. The power switch 18 is configured to detect a switch sliding operation to switch a state of a power supply for the first HMD 100.

Figure 4:
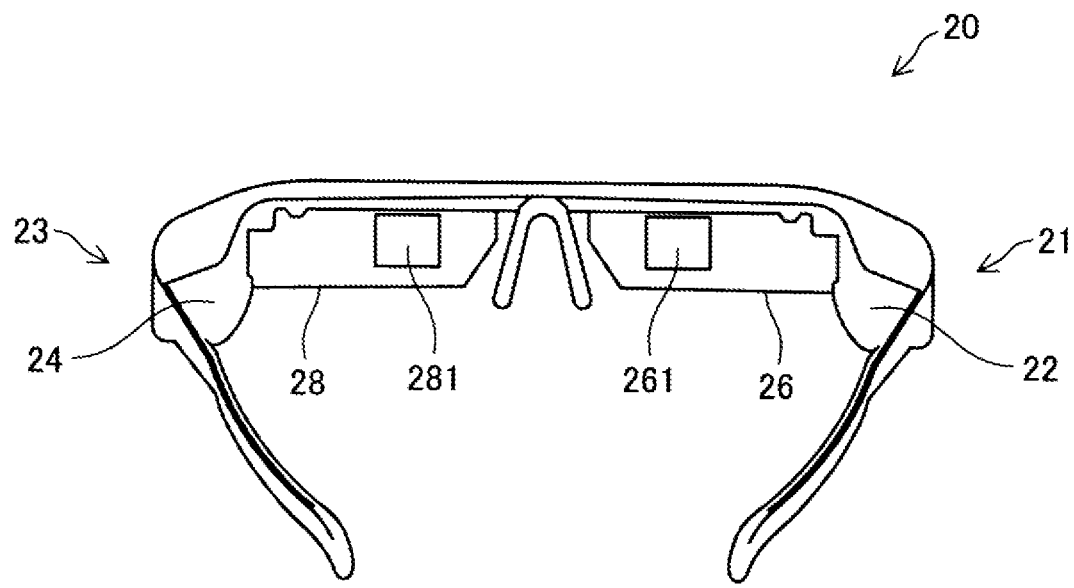
FIG. 4 is a diagram illustrating a configuration of a main part of the first image display unit viewed from a first user.

FIG. 4 is a diagram illustrating a configuration of a main part of the first image display unit 20 viewed from the first user US1. In FIG. 4, illustrations of the connection cable 40, the right earphone 32, and the left earphone 34 are omitted. In the state illustrated in FIG. 4, the back sides of the right light-guiding plate 26 and the left light-guiding plate 28 are visually recognizable. The half mirror 261 configured to irradiate imaging light to the right eye RE, and the half mirror 281 configured to irradiate imaging light to the left eye LE are also visually recognizable as approximately square-shaped regions. The first user US1 visually recognizes an external scene through the entire areas of the right light-guiding plate 26 and the left light-guiding plate 28 including the half mirrors 261 and 281, respectively, and also visually recognizes rectangular display images at the positions of the half mirrors 261 and 281.

Figure 5:
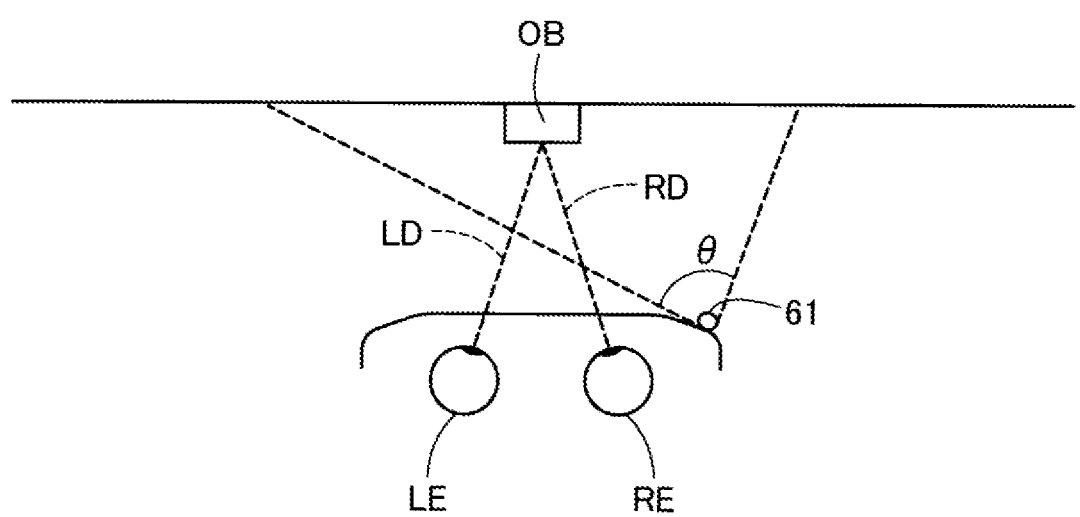
FIG. 5 is a diagram for explaining an angle of view of a camera.

FIG. 5 is a diagram for explaining the angle of view of the camera 61. FIG. 5 schematically illustrates the camera 61, along with the right eye RE and left eye LE of the first user US1, in a plan view. The angle of view (imaging range) of the camera 61 is represented by θ. The angle of view θ of the camera 61 extends not only in a horizontal direction as illustrated in the figure, but also in a perpendicular direction similarly to any common digital camera.

As described above, the camera 61 is arranged at an end on the right-hand side of the first image display unit 20 to capture an image in the line-of-sight direction of the first user US1 (i.e., in front of the user). For this purpose, the optical axis of the camera 61 extends in a direction including line-of-sight directions of the right eye RE and the left eye LE. The external scene that is visually recognizable when the first user US1 wears the first HMD 100 is not necessarily an infinitely distant scene. For example, in a case where the first user US1 fixates on a target object OB with both eyes, the line-of-sight of the first user US1 is directed to the target object OB as illustrated by reference signs RD and LD in the figure. In this case, the distance from the first user US1 to the target object OB often ranges from approximately 30 cm to 10 m, both inclusive, and more often ranges from 1 m to 4 m, both inclusive. Thus, standard maximum and minimum distances from the first user US1 to the target object OB during normal use of first HMD 100 may be specified. These standards may be predetermined and preset in the first HMD 100 or they may be set by the first user US1. The optical axis and the angle of view of the camera 61 are preferably set such that the target object OB is included within the angle of view in a case where the distance to the target object OB during normal use corresponds to the set standards of the maximum and minimum distances.

In general, a visual field angle of a human is known to be approximately 200 degrees in the horizontal direction and approximately 125 degrees in the vertical direction. Within these angles, an effective visual field advantageous for information acceptance performance is approximately 30 degrees in the horizontal direction and approximately 20 degrees in the vertical direction. In general, a stable field of fixation in which a human can promptly and stably view any point of fixation ranges from approximately 60 degrees to 90 degrees, both inclusive, in the horizontal direction and from approximately 45 degrees to 70 degrees, both inclusive, in the vertical direction. In this case, in a case where the point of fixation lies at the target object OB (FIG. 5), the effective visual field is approximately 30 degrees in the horizontal direction and approximately 20 degrees in the vertical direction around the line-of-sights RD and LD. Furthermore, the stable field of fixation ranges from approximately 60 degrees to 90 degrees, both inclusive, in the horizontal direction and from approximately 45 degrees to 70 degrees, both inclusive, in the vertical direction. The visual field of the first user US1 actually and visually recognizing an object through the first image display unit 20, the right light-guiding plate 26, and the left light-guiding plate 28 is referred to as an actual field of view (FOV). The actual field of view is narrower than the visual field angle and the stable field of fixation, but is wider than the effective visual field.

The angle of view θ of the camera 61 according to the present exemplary embodiment is set to capture an image with a range wider than the visual field of the first user US1. The angle of view θ of the camera 61 is preferably set to capture an image with a range wider than at least the effective visual field of the first user US1, and is more preferably set to capture an image with a range wider than the actual field of view. The angle of view θ of the camera 61 is even more preferably set to capture an image with a range wider than the stable field of fixation of the first user US1, and is most preferably set to capture an image with a range wider than the visual field angle of the eyes of the first user US1. The camera 61 may thus include a wide angle lens as an imaging lens, and may be configured to capture an image with a wider angle of view. The wide angle lens may include a super-wide angle lens or a semi-wide angle lens. The camera 61 may also include a fixed focal lens, a zoom lens, or a lens group including a plurality of lenses.

FIG. 6 is a functional block diagram illustrating a configuration of the first HMD 100. The first control device 10 includes a main processor 140 configured to execute a program to control the first HMD 100, storages, input and output units, sensors, interfaces, and a power supply unit 130. The main processor 140 connects to the storages, the input and output units, the sensors, the interfaces, and the power supply unit 130. The main processor 140 is mounted on a controller substrate 120 built into the first control device 10.

The storages include a memory 118 and a non-volatile storage unit 121. The memory 118 constitutes a work area in which computer programs and data to be processed by the main processor 140 are temporarily stored. The non-volatile storage unit 121 is configured by a flash memory or an embedded Multi Media Card (eMMC). The non-volatile storage unit 121 is configured to store computer programs to be executed by the main processor 140 and various data to be processed by the main processor 140. In the present exemplary embodiment, these storages are mounted on the controller substrate 120.

The input and output units include the track pad 14 and an operation unit 110. The operation unit 110 includes the direction key 16, the enter key 17, and the power switch 18, included in the first control device 10. The main processor 140 is configured to control the input and output units, and acquire signals output from the input and output units.

The sensors include a six-axis sensor 111, a magnetic sensor 113, and a global navigation satellite system (GNSS) receiver 115. The six-axis sensor 111 is a motion sensor (inertia sensor) including a three-axis acceleration sensor and a three-axis gyro (angular velocity) sensor. An inertial measurement unit (IMU) in which these sensors are provided as modules may be adopted as the six-axis sensor 111. The magnetic sensor 113 is a three-axis geomagnetic sensor, for example. The GNSS receiver 115 is configured to measure a present position (longitude and latitude) of the first control device 10, based on navigation signals received from artificial satellites constituting the GNSS. The sensors (six-axis sensor 111, magnetic sensor 113, and GNSS receiver 115) output detected values to the main processor 140 in accordance with a predetermined sampling frequency. The sensors may output detected values at timings instructed by the main processor 140.

The interfaces include a wireless communication unit 117, a voice codec 180, an external connector 184, an external memory interface 186, a universal serial bus (USB) connector 188, a sensor hub 192, a field programmable gate array (FPGA) 194, and an interface 196. The components are configured to function as an interface with external devices.

The wireless communication unit 117 is configured to perform wireless communication between the first HMD 100 and an external device. The wireless communication unit 117 is configured to include an antenna (not illustrated), a radio frequency (RF) circuit, a baseband circuit, a communication control circuit, and the like, or is configured as a device into which these components are integrated. The wireless communication unit 117 is configured to perform wireless communication in compliance with standards such as Bluetooth (trade name) and wireless LAN including Wi-Fi (trade name). In the present exemplary embodiment, the wireless communication unit 117 is configured to perform wireless communication with the HMD 100, HMD 200, and the HMD 300 by using Wi-Fi (trade name).

The voice codec 180 is connected to the voice interface 182 and is configured to encode and decode voice signals input and output via the voice interface 182. The voice interface 182 is an interface configured to input and output the voice signals. The voice codec 180 may include an A/D converter configured to convert an analog voice signal into digital voice data and a digital/analog (D/A) converter configured to convert digital voice data into an analog voice signal. The first HMD 100 according to the present exemplary embodiment outputs voice from the right earphone 32 and the left earphone 34 and collects voice from the microphone 63. The voice codec 180 is configured to convert digital voice data output by the main processor 140 into an analog voice signal, and output the analog voice signal via the voice interface 182. The voice codec 180 is also configured to convert an analog voice signal input to the voice interface 182 into digital voice data, and output the digital voice data to the main processor 140.

The external connector 184 is a connector configured to connect the main processor 140 to an external device (e.g., personal computer, smartphone, or gaming device) configured to communicate with the main processor 140. The external device connected to the external connector 184 may serve as a source of contents, may be used to debug a computer program to be executed by the main processor 140, and may be used to collect an operation log of the first HMD 100. The external connector 184 may take various forms. The external connector 184 may be a wired-connection interface such as a USB interface, a micro USB interface, and a memory card interface, or a wireless-connection interface such as a wireless LAN interface and a Bluetooth interface.

The external memory interface 186 is an interface configured to connect a portable memory device. The external memory interfaces 186 include, for example, a memory card slot configured to accept a card recording medium for reading and writing data, and an interface circuit. For example, the size and shape of the card recording medium, as well as standards to be used for the card recording medium, may be appropriately selected. The USB connector 188 is an interface configured to connect a memory device, a smartphone, a personal computer, or the like in compliance with the USB standard. The USB connector 188 includes, for example, a connector and an interface circuit in compliance with the USB standard. For example, the size and shape of the USB connector 188, as well as the version of USB standard to be used for the USB connector 188, may be appropriately selected.

The first HMD 100 further includes a vibrator 19. The vibrator 19 includes a motor (not illustrated), an eccentric rotor, and the like, and is configured to generate vibration under the control of the main processor 140. The first HMD 100 causes the vibrator 19 to generate vibration in a predetermined vibration pattern, for example, in a case where an operation on the operation unit 110 is detected, or in a case where a power supply of the first HMD 100 is turned on or off. The vibrator 19 may be provided, instead of being provided in the first control device 10, in the first image display unit 20, for example, in the right holding part 21 (right temple side) of the first image display unit 20.

The sensor hub 192 and the FPGA 194 are connected to the first image display unit 20 via the interface (I/F) 196. The sensor hub 192 is configured to acquire detected values of various sensors included in the first image display unit 20, and to output the detected values to the main processor 140. The FPGA 194 is configured to process data to be transmitted and received between the main processor 140 and each component of the first image display unit 20, and perform transmission via the interface 196. The interface 196 is connected to the right display unit 22 and the left display unit 24 of the first image display unit 20. In the example of the present exemplary embodiment, the connection cable 40 is connected to the left holding part 23. The wiring, which is laid inside the first image display unit 20, connected to the connection cable 40 causes the right display unit 22 and the left display unit 24 to be connected to the interface 196 of the first control device 10.

Figure 7:
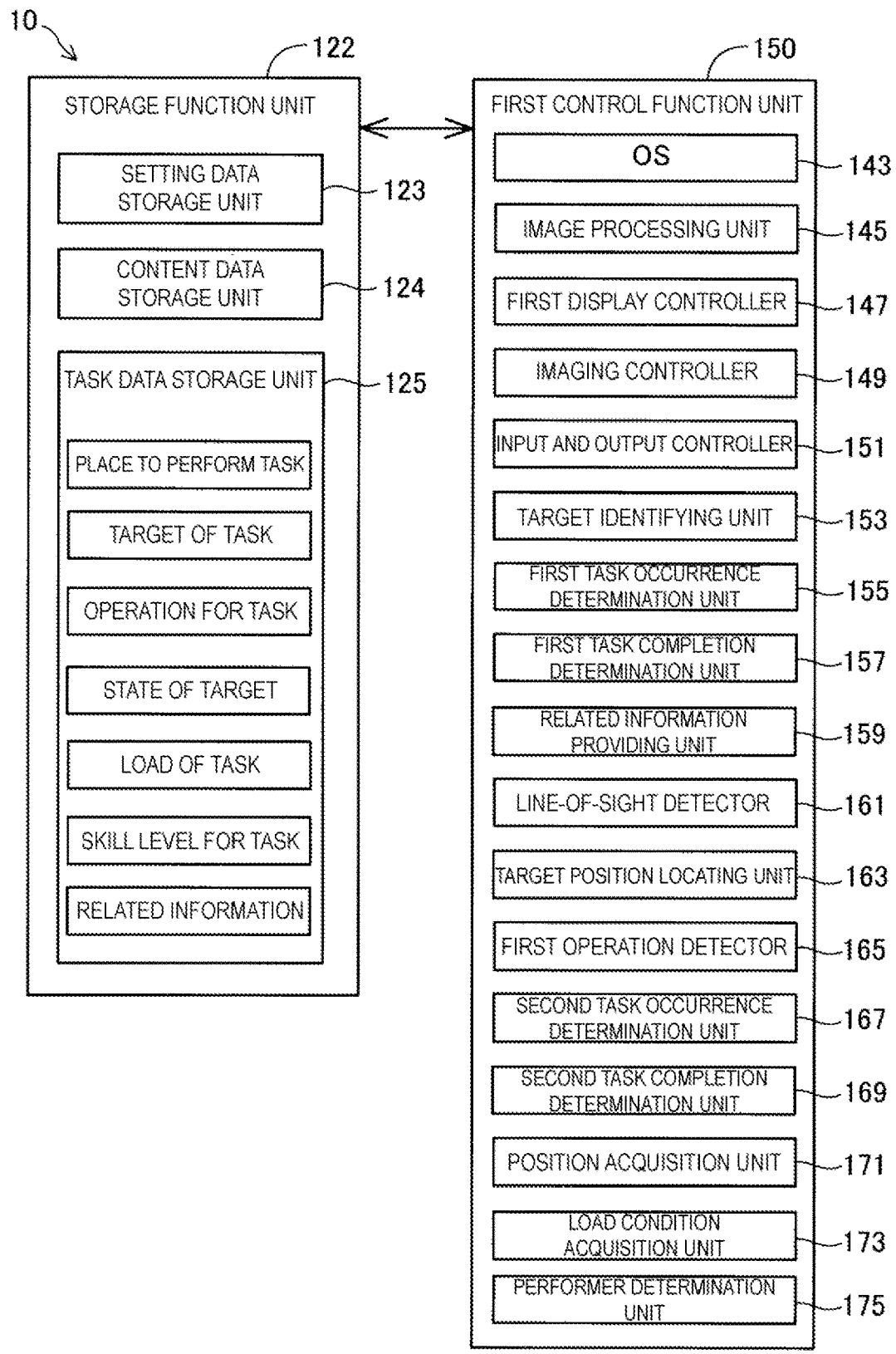
FIG. 7 is a functional block diagram illustrating a configuration of a first control device.

The power supply unit 130 includes a battery 132 and a power supply control circuit 134. The power supply unit 130 is configured to supply power for operating the first control device 10. The battery 132 is a rechargeable battery. The power supply control circuit 134 is configured to detect a remaining capacity of the battery 132 and control charging of an operating system (OS) 143 (FIG. 7). The power supply control circuit 134 is connected to the main processor 140, and is configured to output the detected value of the remaining capacity of the battery 132 and the detected value of a voltage of the battery 132 to the main processor 140. Power may be supplied from the first control device 10 to the first image display unit 20, based on the power supplied by the power supply unit 130. The main processor 140 may be configured to control the state of power supply from the power supply unit 130 to components of the first control device 10 and the first image display unit 20.

The right display unit 22 includes a display unit substrate 209, the OLED unit 221, the camera 61, an illuminance sensor 65, an LED indicator 67, and the temperature sensor 217. An interface (I/F) 211 connected to the interface 196, a receiving unit (Rx) 213, and an electrically erasable programmable read-only memory (EEPROM) 215 are mounted on the display unit substrate 209. The receiving unit 213 is configured to receive data input from the first control device 10 via the interface 211. In a case of receiving image data of an image to be displayed on the OLED unit 221, the receiving unit 213 outputs the received image data to the OLED drive circuit 225 (FIG. 3).

The EEPROM 215 is configured to store various data in such a manner that the main processor 140 can read the data. The EEPROM 215 is configured to store, for example, data about light emission properties and display properties of the OLED units 221 and 241 of the first image display unit 20, and data about sensor properties of the right display unit 22 or the left display unit 24. Specifically, for example, the EEPROM 215 is configured to store parameters regarding Gamma correction performed by the OLED units 221 and 241, and data used to compensate for the detected values of the temperature sensors 217 and 239 described below. These kinds of data are generated by inspection at the time of shipping of the first HMD 100 from a factory, and are written into the EEPROM 215. After shipment, the data is loaded from the EEPROM 215 into the main processor 140, and is used for various processes.

The camera 61 is configured to capture an image in accordance with a signal entered via the interface 211, and output an imaging data or a signal indicating the result of capturing the image to the first control device 10. As illustrated in FIG. 2, the illuminance sensor 65 is arranged on the end ER of the front frame 27 and is arranged to receive outside light from the front of the first user US1 wearing the first image display unit 20. The illuminance sensor 65 is configured to output a detected value corresponding to the amount of received light (intensity of received light). As illustrated in FIG. 2, the LED indicator 67 is disposed near the camera 61 on the end ER of the front frame 27. The LED indicator 67 is configured to be turned on during image capturing by the camera 61 to notify that the image capturing is in progress.

The temperature sensor 217 is configured to detect a temperature to output a voltage value or a resistance value corresponding to the detected temperature. The temperature sensor 217 is mounted on the rear face side of the OLED panel 223 (FIG. 3). The temperature sensor 217 may be mounted, for example, on the same substrate as the substrate on which the OLED drive circuit 225 is mounted. This configuration allows the temperature sensor 217 to mainly detect the temperature of the OLED panel 223. The temperature sensor 217 may be built into the OLED panel 223 or the OLED drive circuit 225 (FIG. 3). For example, in a case where the OLED panel 223 as an Si-OLED, together with the OLED drive circuit 225, is mounted as an integrated circuit on an integrated semiconductor chip, the temperature sensor 217 may be mounted on the semiconductor chip.

The left display unit 24 includes a display unit substrate 230, the OLED unit 241, and the temperature sensor 239. An interface (I/F) 231 connected to the interface 196, a receiving unit (Rx) 233, a six-axis sensor 235, and a magnetic sensor 237 are mounted on the display unit substrate 230. The receiving unit 233 is configured to receive data input from the first control device 10 via the interface 231. In a case where the receiving unit 233 receives image data of an image to be displayed on the OLED unit 241, the receiving unit 233 outputs the received image data to the OLED drive circuit 245 (FIG. 3).

The six-axis sensor 235 is a motion sensor (inertial sensor) including a three-axis acceleration sensor and a three-axis gyro (angular velocity) sensor. The six-axis sensor 235 may be an IMU in which the above-described sensors are provided as modules. The magnetic sensor 237 is a three-axis geomagnetic sensor, for example. The six-axis sensor 235 and the magnetic sensor 237 are provided in the first image display unit 20, and thus detect a motion of the head of the first user US1 when the first image display unit 20 is mounted on the head of the first user US1. The orientation of the first image display unit 20, i.e., the field of view of the first user US1, is determined based on the detected motion of the head.

The temperature sensor 239 is configured to detect the temperature to output a voltage value or a resistance value corresponding to the detected temperature. The temperature sensor 239 is mounted on the rear face side of the OLED panel 243 (FIG. 3). The temperature sensor 239 may be mounted, for example, on the same substrate as the substrate on which the OLED drive circuit 245 is mounted. This configuration allows the temperature sensor 239 to mainly detect the temperature of the OLED panel 243. The temperature sensor 239 may be built into the OLED panel 243 or the OLED drive circuit 245 (FIG. 3). Details of the temperature sensor 239 is similar to the temperature sensor 217.

The sensor hub 192 of the first control device 10 connects to the camera 61, the illuminance sensor 65, and the temperature sensor 217 of the right display unit 22, and to the six-axis sensor 235, the magnetic sensor 237, and the temperature sensor 239 of the left display unit 24. The sensor hub 192 is configured to set and initialize a sampling period of each sensor under the control of the main processor 140. Based on the sampling periods of the sensors, the sensor hub 192 supplies power to the sensors, transmits control data, and acquires detected values, for example. The sensor hub 192 is configured to output, at a preset timing, detected values of the sensors included in the right display unit 22 and the left display unit 24, to the main processor 140. The sensor hub 192 may be configured to include a cache function to temporarily retain the detected values of the sensors. The sensor hub 192 may be configured to include a function to convert a signal format or a data format of detected values of the sensors (e.g., function for conversion into a standard format). The sensor hub 192 is configured to start and stop supplying power to the LED indicator 67 under the control of the main processor 140 to turn on or off the LED indicator 67.

FIG. 7 is a functional block diagram illustrating a configuration of the first control device 10. In terms of functions, the first control device 10 includes a storage function unit 122 and the first control function unit 150. The storage function unit 122 is a logical storage configured upon the non-volatile storage unit 121 (FIG. 6). Instead of a configuration in which only the storage function unit 122 is used, the storage function unit 122 may be configured to use the EEPROM 215 or the memory 118 in combination with the non-volatile storage unit 121. The first control function unit 150 is configured by the main processor 140 that executes a computer program, i.e., by hardware and software that operate together.

The storage function unit 122 is configured to store various data to be processed by the first control function unit 150. Specifically, the storage function unit 122 according to the present exemplary embodiment is configured to include a setting data storage unit 123, a content data storage unit 124, and a task data storage unit 125. The setting data storage unit 123 is configured to store various setting values regarding operations of the first HMD 100. For example, the setting data storage unit 123 is configured to store parameters, determinants, arithmetic expressions, look up tables (LUTs), and the like that are used by the first control function unit 150 for control of the first HMD 100.

The content data storage unit 124 is configured to store data (image data, video data, voice data, and the like) of contents including images and videos to be displayed by the first image display unit 20 under the control of the first control function unit 150. The content data storage unit 124 may be configured to store data of bidirectional content. The bidirectional content means a type of content that is displayed by the first image display unit 20 in accordance with an operation of the user. The operation unit 110 acquires the operation of the user, the first control function unit 150 performs a process corresponding to the acquired operation, and the first image display unit 20 displays a content corresponding to the process. In this case, the data of content may include data such as an image data of a menu screen used to acquire an operation of the user, and data for specifying a process corresponding to an item included in the menu screen.

In the task data storage unit 125, in the operation support system 1, various data are stored for tasks that each of the users US1, US2, and US3 needs to perform. In the present exemplary embodiment, the "task" means a predetermined operation as an operation of a restaurant staff at the eating establishment Rst where the operation support system 1 runs. For example, an operation such as "take order", "carry dishes", or "take away plates" corresponds to the task. In the task data storage unit 125, respective pieces of data such as a place to perform the task, a target of the task, an operation for the task, a state of the target, a load of the task, a skill level for the task, and related information are associated with the task and stored. The respective pieces of data are utilized in operation support processing described later. As will be described later, a task and a user are associated with each other. That is, a first task is defined as a task that the first user US1 performs, and a second task is defined as a task that a user other than the first user US1 performs.

In the present exemplary embodiment, the "place to perform the task" means a place where the operation support system 1 runs. For example, in addition to the eating establishment Rst of the present exemplary embodiment, a place where the plurality of workers cooperates and works such as a department store or a football stadium is applicable. Further, the "target of the task" means a target of performance (someone or something) when the task is performed, and is predetermined according to the place to perform the task and the task. For example, in a case of the above-described "take order" task, the target of the task is a "customer", and in cases of the "carry dishes" task and the "take away plates" task, the target of the task is a "plate". Further, the "operation for the task" means body movements when the task is performed, and is predetermined according to the task. For example, in the above case of the "take order" task, as for the operation for the task, a series of movements, such as moving to a table, looking at the face of a customer, taking order, inputting to a handy terminal, and taking away a menu, is applicable. In the present exemplary embodiment, detection results of the six-axis sensor 111 in cases where various movements associated with the operation for the task that are actually performed, are calculated in advance by experiments, and stored in the task data storage unit 125 as the "operation for the task".

The "state of the target" means a state or appearance of the target of the task in a captured image captured by the camera 61. For example, as for the "state of the target", a state where a "customer" as the target of the task is looking at a restaurant staff, a state where food is put on a "plate" as the target of the task, a state where "plates" as the target of the task are insufficient, or the like, is applicable.

In the present exemplary embodiment, the "state of the target" is predetermined as a start condition of a first task, according to the first task. The "first task" means a task that the first user US1 needs to perform. For example, when the first task is the above-mentioned "take order" task, a start condition of the first task is defined as a state where a "customer" as the target of the task is looking at the first user US1, that is, a restaurant staff, for a predetermined period of time. Further, for example, when the first task is the above-mentioned "carry dishes" task, a start condition of the first task is defined as a state where after food is put on a "plate" as the target of the task, a predetermined period of time lapses. Additionally, for example, when the first task is the above-mentioned "take away plates" task, a start condition of the first task is defined as a state where the number of "plates" as the target of the task is lower than a predetermined number of plates. Note that, the above-mentioned predetermined period of time in the present exemplary embodiment means three seconds. Note that, as the predetermined period of time, any other period of time may be set, instead of three seconds. In addition, the above predetermined number of plates means three plates. Note that, as the predetermined number of plates, any other number of plates may be set, instead of three plates.

The "load of the task" means a processing load required for performing the task and a difficulty level, and is expressed as a score in advance by using predetermined weighting according to complexity of the task and a required skill level. For example, the "take order" task and the "carry dishes" task are complicated as compared to the "take away plates" task, and thus scores for these tasks are set to be higher. The "skill level for the task" means a skill level for the task for a restaurant staff, and is expressed as a score in advance by using predetermined weighting for each task and each restaurant staff. For example, a score of a skill level of a restaurant staff with long years of experience is set to be higher than that of a skill level of a restaurant staff with short years of experience. In the present exemplary embodiment, respective scores are set to decrease in order of the first user US1, the second user US2, and the third user US3.

The "related information" means information related to the task, and is predetermined according to the task, and includes information indicating that the task occurs, information indicating a position of the target of the task, information indicating a performing procedure of the task, or the like. For example, in the above-mentioned case of the "take order" task, information such as a position of the target of the task inside the eating establishment Rst, a procedure for taking order, or words to say to the target of the task in taking order are applicable. Further, for example, in the above-mentioned case of the "carry dishes" task, information such as a position of a table toward which a dish is carried, or a name of a dish is applicable. Additionally, for example, in the above-mentioned case of the "take away plates" task, information such as the number of insufficient plates, or a menu for which insufficient plates are used is applicable.

The first control function unit 150 is configured to use data stored in the storage function unit 122 to execute various processes, thereby performing functions of the operating system (OS) 143, an image processing unit 145, a first display controller 147, an imaging controller 149, an input and output controller 151, a target identifying unit 153, a first task occurrence determination unit 155, a first task completion determination unit 157, a related information providing unit 159, a line-of-sight detector 161, a target position locating unit 163, a first operation detector 165, a second task occurrence determination unit 167, a second task completion determination unit 169, a position acquisition unit 171, a load condition acquisition unit 173, and a performer determination unit 175. In the present exemplary embodiment, the function units other than the OS 143 are configured as computer programs to be executed on the OS 143.

The image processing unit 145 is configured to generate, based on image data or video data to be displayed on the first image display unit 20, signals to be transmitted to the right display unit 22 and the left display unit 24. The signals generated by the image processing unit 145 may be a vertical synchronization signal, a horizontal synchronization signal, a clock signal, an analog image signal, and the like. The image processing unit 145 may be implemented by the main processor 140 that executes a corresponding computer program, or may be configured by using hardware different from the main processor 140 (e.g., digital signal processor (DSP)).

The image processing unit 145 may be configured to execute a resolution conversion process, an image adjustment process, a 2D/3D conversion process, and the like when needed. The resolution conversion process is a process for converting the resolution of image data into a resolution appropriate for the right display unit 22 and the left display unit 24. The image adjustment process is a process for adjusting the brightness and saturation of image data. The 2D/3D conversion process is a process for generating a two-dimensional image data from a three-dimensional image data, or generating a three-dimensional image data from a two-dimensional image data. In a case where any of the processes is executed, the image processing unit 145 is configured to generate a signal for displaying an image based on the processed image data and transmits the signal to the first image display unit 20 via the connection cable 40.

The first display controller 147 is configured to generate control signals for controlling the right display unit 22 and the left display unit 24, and use the control signals to control the generation and emission of the imaging light by each of the right display unit 22 and the left display unit 24. Specifically, the first display controller 147 is configured to control the OLED drive circuits 225 and 245 to cause the OLED panels 223 and 243 to display images. The first display controller 147 is configured to control, for example, the timing when the OLED drive circuits 225 and 245 draw images on the OLED panels 223 and 243, and the brightness of the OLED panels 223 and 243, based on the signal output by the image processing unit 145. Further, the first display controller 147, in operation support processing described later, is configured to control the first image display unit 20 to display related information.

The imaging controller 149 is configured to control the camera 61 to capture an image and generate captured imaging data, and to cause the storage function unit 122 to temporarily store the captured imaging data. In a case where the camera 61 is configured as a camera unit including a circuit for generating imaging data, the imaging controller 149 is configured to acquire the imaging data from the camera 61 and causes the storage function unit 122 to temporarily store the imaging data. Further, the imaging controller 149, in the operation support processing described later, is configured to repeatedly capture an image of an external scene transmitting the first image display unit 20 and visually recognized to acquire captured images. The acquired captured images are utilized when the target of the task and the state of the target are identified.

The input and output controller 151 is configured to appropriately control the track pad 14 (FIG. 2), the direction key 16, and the enter key 17 to receive input commands from them. The received input commands are output to the OS 143 or to a computer program that operates on the OS 143 together with the OS 143.

The target identifying unit 153 is configured to identify a target of the task by analyzing a captured image captured by the camera 61. The target identifying unit 153 is configured to utilize known techniques such as face recognition and pattern matching, to detect a person or an object that can be the target of the task in a captured image.

The first task occurrence determination unit 155 is configured to determine whether a first task occurs or not, based on a state of the target in a captured image. The first task occurrence determination unit 155, when the state of the target of the task identified by the line-of-sight detector 161 described later matches the "state of the target" stored in the task data storage unit 125, determines that the first task occurs.

The first task completion determination unit 157 is configured to determine whether a first task is completed or not. Specifically, the first task completion determination unit 157, when the first user US1 operates in an identical manner to an operation for a first task and stored, corresponding to the first task, in the task data storage unit 125, at a position of a target of the first task located by the target position locating unit 163, is configured to determine that the first task is completed.

The related information providing unit 159 is configured to provide related information, via the wireless communication unit 117, to the second HMD 200 and the third HMD 300.

The line-of-sight detector 161 is configured to detect a line-of-sight of a target of the task in a captured image. By detecting the line-of-sight, a state of the target of the task, that is, a state where a customer is looking at a user (restaurant staff) and wants to order food, is identified.

The target position locating unit 163 is configured to locate a position of a target of the task. The target position locating unit 163 is configured to calculate a distance from the camera 61 to the target of the task, by utilizing an angle of view of the camera 61, a manner in which the target of the task is captured in a captured image, 3D object mapping, and the like, to locate a position of the target of the task. The first operation detector 165 is configured to utilize a detection result of the six-axis sensor 111, to detect movements of the body of the first user US1.

The second task occurrence determination unit 167 is configured to determine whether a second task occurs or not. The "second task" means a task that a user other than the first user US1 among users of the HMDs inside the operation support system 1, needs to perform. In the present exemplary embodiment, the second task means a task that the second user US2 or the third user US3 needs to perform. Note that, a performer of the second task is determined, in the operation support processing described later, based on positions and load conditions of the respective users US2 and US3. The second task occurrence determination unit 167 is configured to determine whether a second task occurs or not, by determining whether a first task is completed or not.

The second task completion determination unit 169 is configured to determine whether a second task is completed or not, by acquiring a notification indicating that the second task is completed (hereinafter, referred to as a "second task completion notification") from a HMD of a performer of the second task via the wireless communication unit 117.

The position acquisition unit 171 is configured to acquire a current position of the user US2 from the second HMD 200, and a current position of the user US3 from the third HMD 300, via the wireless communication unit 117. The respective acquired positions are utilized when a performer of a second task is determined.

The load condition acquisition unit 173 is configured to refer to the task data storage unit 125 to acquire respective load conditions of the users US1, US2, and US3. The respective acquired load conditions are utilized when a performer of a second task is determined.

The performer determination unit 175 is configured to determine a performer of a second task, based on respective acquired current positions and load conditions of users.

As illustrated in FIG. 2, the second HMD 200 includes a second image display unit 220 and a second control device 210. Components included in the second HMD 200 are similar to those of the above first HMD 100 except for a control function unit of the second control device 210, and thus detailed descriptions of the components will be omitted.

Figure 8:
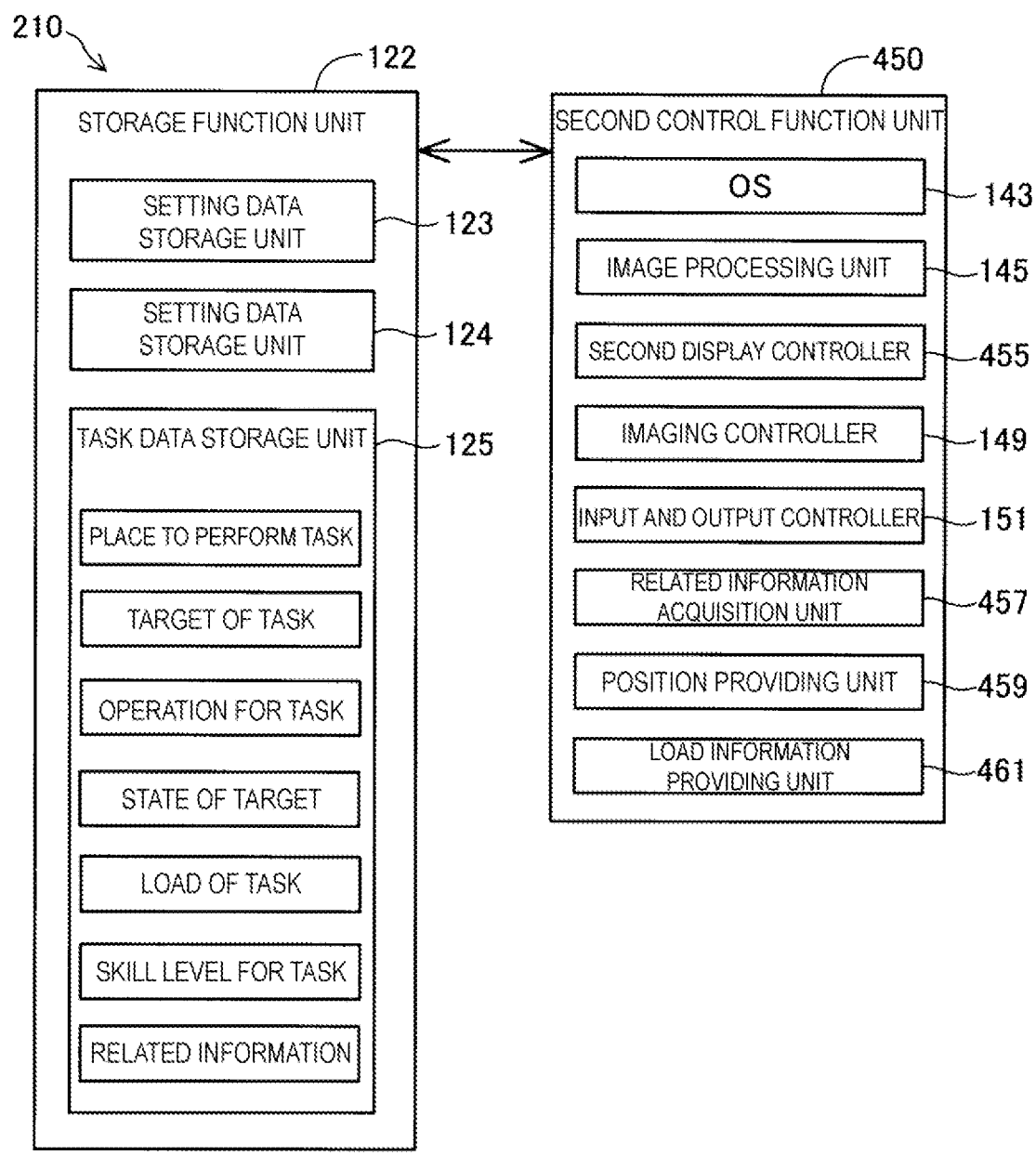
FIG. 8 is a functional block diagram illustrating a configuration of a second control device.

FIG. 8 is a functional block diagram illustrating a configuration of the second control device 210. The second control device 210 differs from the first control device 10 illustrated in FIG. 7 in that a second control function unit 450 is included instead of the first control function unit 150. Since the other configurations of the second control device 210 are identical to those of the first control device 10, identical reference signs are assigned to identical components and detailed description of the components will be omitted.

A second display controller 455 has a similar configuration to that of the first display controller 147, and is configured to control generation and emission of imaging light, and control the second image display unit 220 to display an image of a display target. Further, the second display controller 455, is configured to control the second image display unit 220 to display related information acquired by a related information acquisition unit 457 described later.

The related information acquisition unit 457 is configured to acquire first related information, via communication by the wireless communication unit 117, from the first HMD 100. In the present exemplary embodiment, the "first related information" is information related to a first task. A position providing unit 459 is configured to utilize radio field intensity of Wi-Fi (trade name) to locate a position of the second HMD 200, and provide the located position to the first HMD 100 via the wireless communication unit 117. A load condition providing unit 461 is configured to refer to the task data storage unit 125 and specify a load of a task that the second user US2 is performing, and provide the specified load condition to the first HMD 100 via the wireless communication unit 117.

As illustrated in FIG. 2, the third HMD 300 includes a third image display unit 320 and a third control device 310. Components included in the third HMD 300 are similar to those of the above first HMD 100 except for a control function unit of the third control device 310, and thus detailed descriptions of the components will be omitted.

Figure 9:
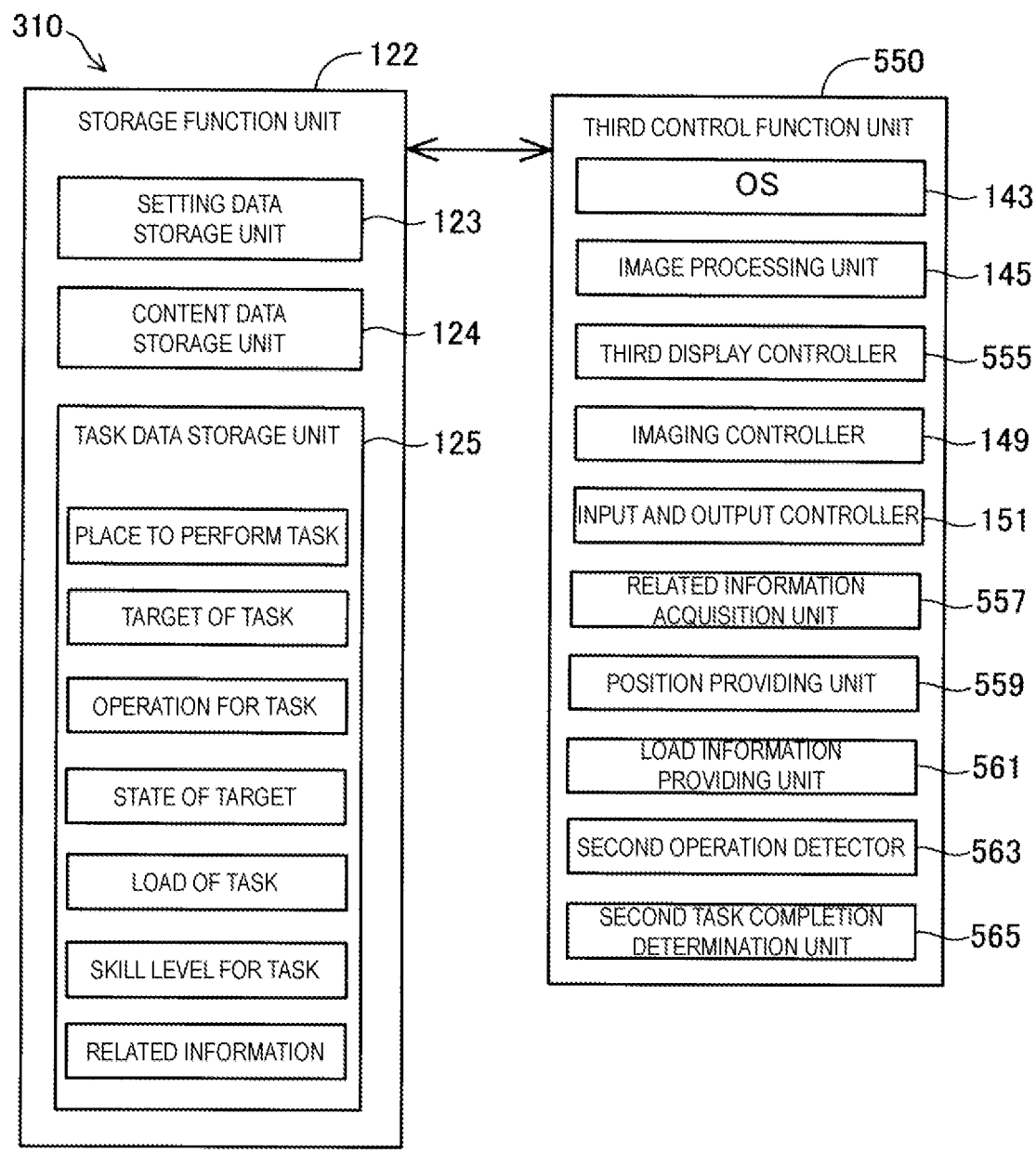
FIG. 9 is a functional block diagram illustrating a configuration of a third control device.

FIG. 9 is a functional block diagram illustrating a configuration of the third control device 310. The third control device 310 differs from the first control device 10 illustrated in FIG. 7 in that a third control function unit 550 is included instead of the first control function unit 150. Since the other configurations of the third control device 310 are identical to those of the first control device 10, identical reference signs are assigned to identical components, and detailed description of those components will be omitted.

A third display controller 555 has a similar configuration to that of the first display controller 147, and is configured to control generation and emission of imaging light and control the third image display unit 320 to display an image of a display target. Further, the third display controller 555, as in the second display controller 455 of the second HMD 200, is configured to control the third image display unit 320 to display related information acquired by a related information acquisition unit 557 described later.

The related information acquisition unit 557, as in the related information acquisition unit 457 of the second HMD 200, is configured to acquire first related information from the first HMD 100, via communication by the wireless communication unit 117, and in addition to that, to acquire second related information. In the present exemplary embodiment, the "second related information" is information related to a second task. A position providing unit 559 has a similar configuration to that of the position providing unit 459 of the second HMD 200, and is configured to utilize radio field intensity of Wi-Fi (trade name) to locate a position of the third HMD 300, and provide the located position to the first HMD 100 via the wireless communication unit 117. A load condition providing unit 561 has a similar configuration to that of the load condition providing unit 461 of the second HMD 200, and is configured to refer to the task data storage unit 125 and specify a load of a task that the third user US3 is performing, and provide the specified load condition to the first HMD 100 via the wireless communication unit 117.

A second operation detector 563 is configured to utilize a detection result of the six-axis sensor 111, to detect movements of the body of the third user US3. A second task completion determination unit 565 is configured to determine whether a second task is completed. Specifically, the second task completion determination unit 565, is configured to determine that the second task is completed, by using a similar procedure to that of the first task completion determination unit 157 of the first HMD 100, in other words, when the third user US3 operates in an identical manner to an operation for the second task stored, corresponding to the second task, in the task data storage unit 125, at a position of a target of the second task.

In the present exemplary embodiment, the camera 61 corresponds to a subordinate concept of an imaging unit in other embodiments. The wireless communication unit 117 corresponds to a subordinate concept of a communication unit in other embodiments. The first operation detector 165 corresponds to a subordinate concept of an operation detector in other embodiments. The related information acquisition unit 457 and the related information acquisition unit 557 correspond to a subordinate concept of a first related information acquisition unit and a subordinate concept of a second related information acquisition unit, in other embodiments, respectively.

A3. Augmented Reality Display

Figure 10:
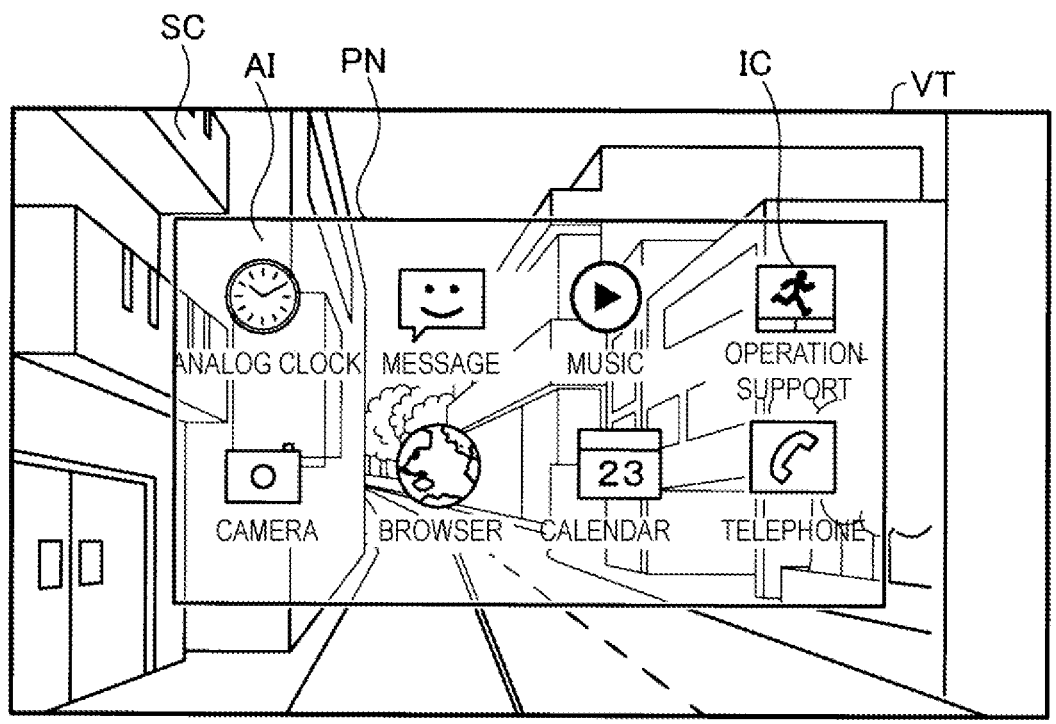
FIG. 10 is an explanatory diagram illustrating an example of augmented reality display.

FIG. 10 is an explanatory diagram illustrating an example of augmented reality display. In FIG. 10, a field of view VT of a first user is illustrated. As described above, imaging light guided to the eyes of the first user US1 is formed into an image on the retinas of the user, allowing the first user US1 to visually recognize, in a display region PN, an object image AI of a display target as augmented reality (AR). In the example illustrated in FIG. 10, the object image AI is a menu screen of the OS of the first HMD 100. The menu screen includes icon images for activating application programs such as "Analog clock", "Message", "Music", "Operation Support", "Camera", "Browser", "Calendar", and "Telephone". Furthermore, external light passes through the right light-guiding plate 26 and the left light-guiding plate 28, allowing the first user US1 to visually recognize an external scene SC. Thus, the first user US1 can view, in a portion displaying the object image AI in the field of view VT, the object image AI in such a manner that the object image AI overlaps the external scene SC. Furthermore, in a portion not displaying the object image AI in the field of view VT, only the external scene SC can be viewed.

A4. Operation Support Processing

Figure 11:
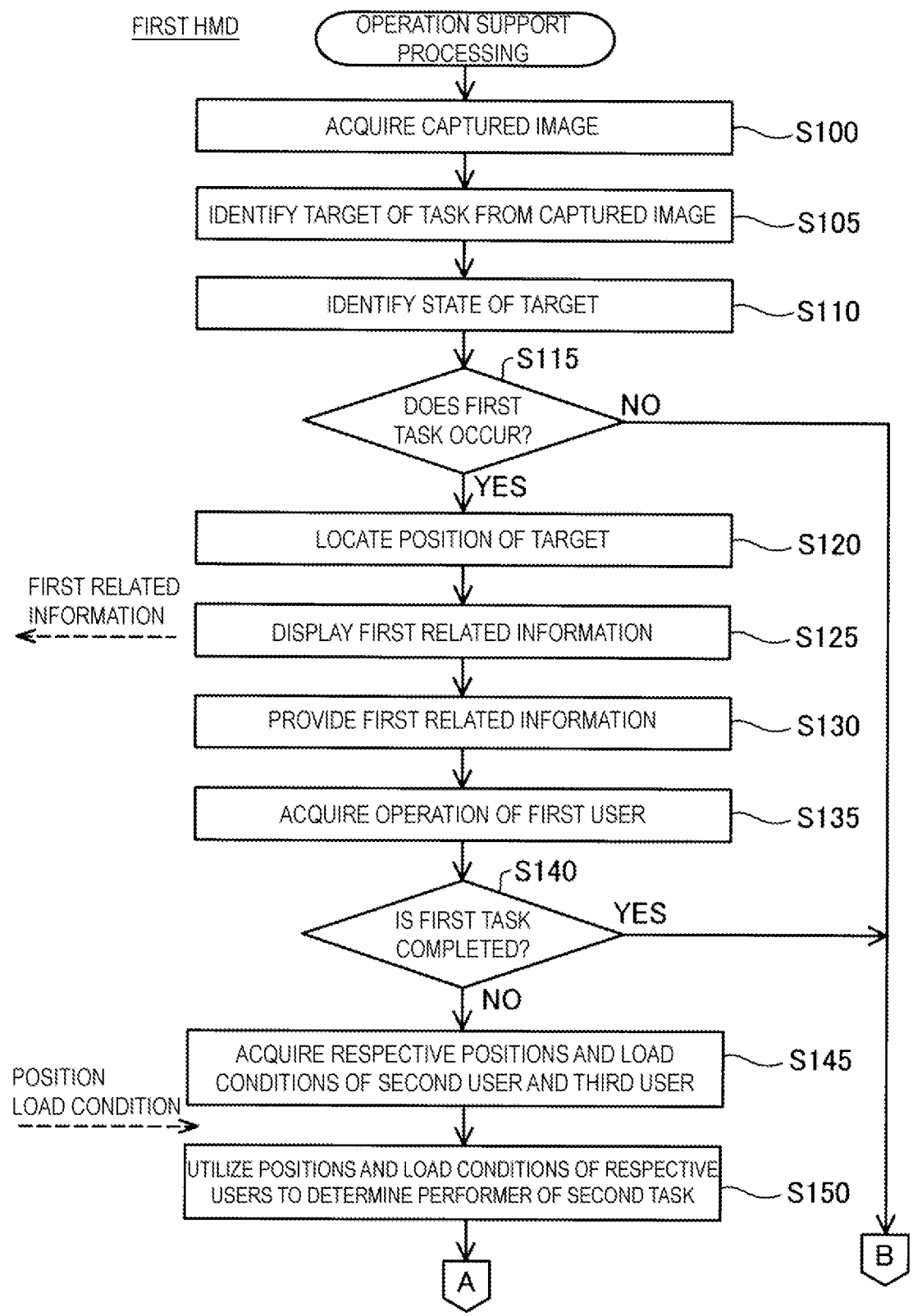
FIG. 11 is a flowchart illustrating how operation support processing proceeds in a first HMD.
Figure 12:
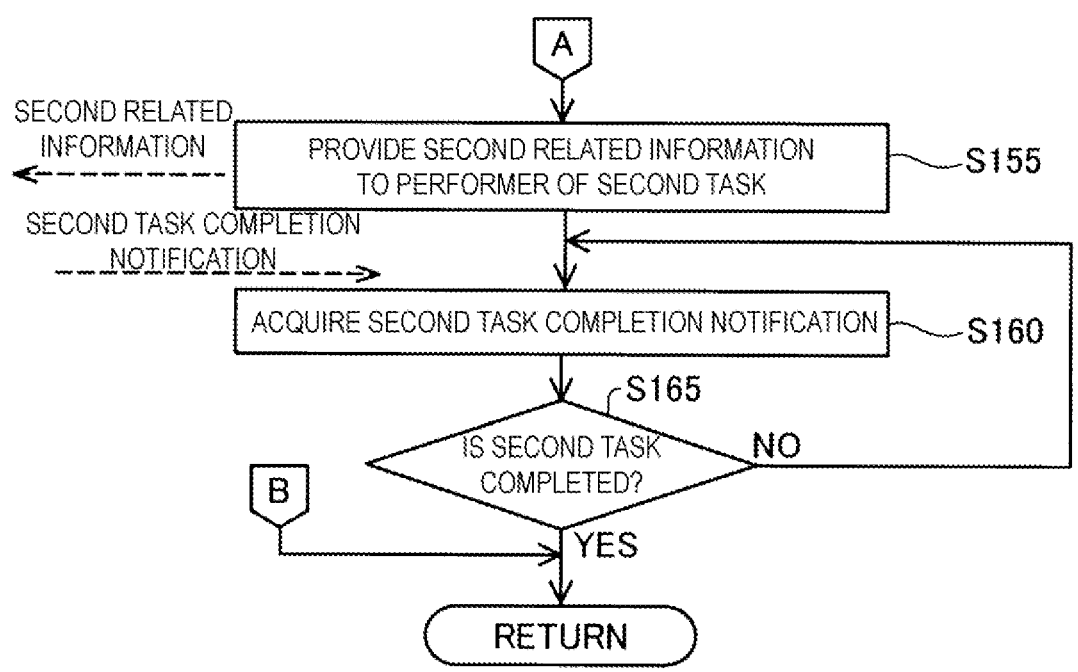
FIG. 12 is a flowchart illustrating how the operation support processing proceeds in the first HMD.

Each of FIG. 11 and FIG. 12 is a flowchart illustrating how operation support processing proceeds in the first HMD 100. The operation support processing in the first HMD 100 is started when the "Operation Support" menu illustrated in FIG. 10 is executed to activate an "Operation Support"

application. The imaging controller 149 controls the camera 61 to capture an image in a field of view direction of the first user US1, and acquire a captured image (step S100). At this time, the imaging controller 149 controls the camera 61 to repeatedly capture an image for a predetermined period of time, and acquires a plurality of captured images. Note that, in the following descriptions, explanation will be given assuming that, in step S100, captured images are acquired in which the customer Tg1 illustrated in FIG. 1 is looking at the first user US1 for a predetermined period of time (three seconds).

As illustrated in FIG. 11, the target identifying unit 153 identifies a target of the task from the captured images (step S105). Specifically, the target identifying unit 153 analyzes a person or an object appearing in the captured images and matches the person or the object to each "target of the task" stored in the task data storage unit 125 by pattern matching or the like, to identify a target of the task. As described above, in the present exemplary embodiment, the target of the task is a "customer" (person) or a "plate" (object), and thus the target identifying unit 153 detects a person or a plate appearing in the captured images. In an example illustrated in FIG. 1, when an image is captured that includes the customer Tg1 by the camera 61 of the first HMD 100 worn by the first user US1, the customer Tg1 is identified as a target of the task.

As illustrated in FIG. 11, the line-of-sight detector 161 identifies a state of the target of the task (step S110). Specifically, the line-of-sight detector 161 detects a line-of-sight of the target of the task, by deriving a direction at which the target of the task is looking from a plurality of the captured images repeatedly captured by the camera 61. At this time, the line-of-sight detector 161 detects change in the detected line-of-sight over time as well, and for example, detects for how many seconds the line-of-sight is kept. In the example illustrated in FIG. 1, since the customer Tg1 as the target of the task is looking at and watching the first user US1, a state where the target of the task is looking at the first user US1 for the predetermined period of time is identified as a state of the target of the task, in step S110. In this way, the operation support system 1, while the first user US1 is performing restaurant staff operations, automatically determines whether a first task occurs or not. In other words, in order to determine whether the first task occurs or not, the first user US1 need not to perform a special operation.

As illustrated in FIG. 11, the first task occurrence determination unit 155 determines whether a first task occurs or not (step S115). Specifically, the first task occurrence determination unit 155, by determining whether the state of the target identified in the above step S110 matches a "state of the target" stored in the task data storage unit 125 or not, determines whether a first task occurs or not. Specifically, when the identified state of the target does not match the "state of the target" in the task data storage unit 125, the first task occurrence determination unit 155 determines that a first task does not occur (step S115: NO), and thus the above step S100 is executed, as illustrated in FIG. 11 and FIG. 12. On the other hand, when the identified state of the target matches the "state of the target" in the task data storage unit 125, the first task occurrence determination unit 155 determines that a first task occurs (step S115: YES), and thus step S120 described later is executed.

In the example illustrated in FIG. 1, the state of the target identified in the above step S110 is a state where the target of the task is looking at the first user US1 for a predetermined period of time. Additionally, as described above, the "state of the target" in the task data storage unit 125 is a state where the "customer" as the target of the task is looking at the restaurant staff for a predetermined period of time, and this state is the state of the target of the "take order" task. Accordingly, the first task occurrence determination unit 155 determines that the "take order" task (hereinafter, referred to as the "first task") occurs.

As illustrated in FIG. 11, the target position locating unit 163 locates a position of the target of the first task (step S120). Specifically, the target position locating unit 163 locates a position of the target, by utilizing a known technique such as 3D object mapping to calculate a distance from the camera 61 to the target of the first task. The first display controller 147 controls such that first related information is displayed (step S125). Specifically, the first display controller 147 refers to "related information" stored in the task data storage unit 125, and controls the first image display unit 20 to display a display image indicating the first related information (hereinafter, referred to as the "related information image").

Figure 13:
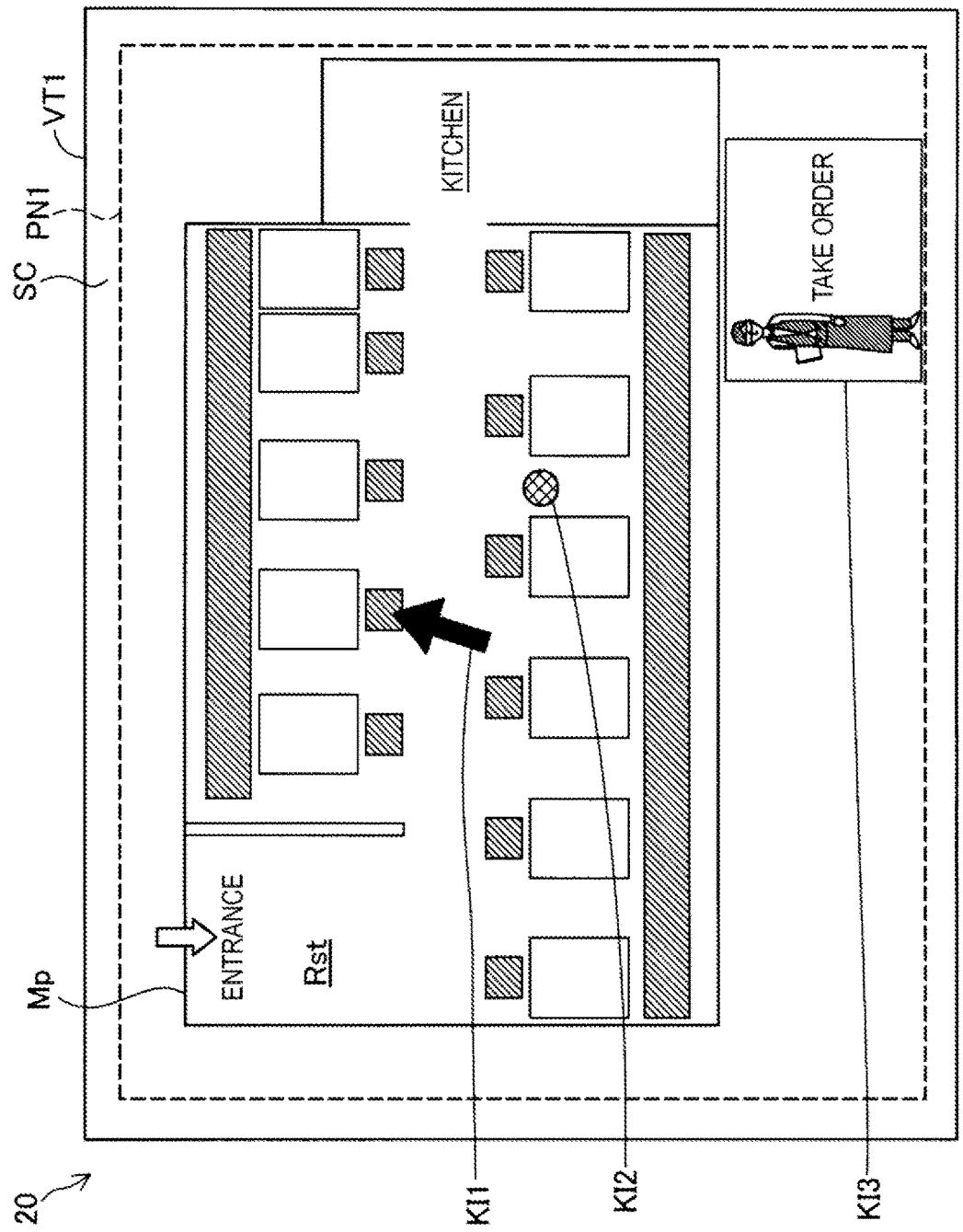
FIG. 13 is an explanatory diagram schematically illustrating a field of view of a first user after the execution of step S125.

FIG. 13 is an explanatory diagram schematically illustrating a field of view VT1 of a first user US1 after execution of step S125. In FIG. 13, the first image display unit 20 of the first HMD 100 is illustrated. In FIG. 13, illustration of the external scene SC of the field of view VT1 is omitted. As illustrated in FIG. 13, an in-store map image Mp of the eating establishment Rst, and related information images KI1, KI2, and KI3 are displayed, in a display region PN1. The in-store map image Mp is an image of a map of the eating establishment Rst illustrated in FIG. 1 viewed from a ceiling side, and is stored in the content data storage unit 124 in advance.

The related information image KI1 is an image denoting a position of the customer Tg1 as the target of the first task by an arrow. The related information image KI2 is an image denoting a position of the first user US1 as a performer of the first task by a circle. The related information image KI3 is an image indicating contents of the first task. In the example illustrated in FIG. 13, the related information image KI3 is an image that represents the first task ("take order" task) and expresses a state of taking a menu to a customer. In this way, by allowing the first image display unit 20 of the first user US1 to display the related information images KI1, KI2, and KI3, it is possible to allow the first user US1 to know the occurrence of the first task.

As illustrated in FIG. 11, the related information providing unit 159 provides first related information, via the wireless communication unit 117, to the second HMD 200 and the third HMD 300 (step S130). Note that, the first related information provided to the second HMD 200 and the third HMD 300 is identical to the first related information displayed on the first image display unit 20 in the above step S125 but, for example, may be only information indicating contents of the first task, or the information indicating the contents of the first task and information indicating a position of the target of the first task. The related information providing unit 159 may add and provide related information other than those described above.

The first operation detector 165 utilizes a detection result of the six-axis sensor 111 of the first HMD 100, to acquire an operation of the first user US1 (step S135). Additionally, at this time, the first operation detector 165 utilizes radio field intensity of Wi-Fi (trade name) to locate a position of the first HMD 100, that is, a position of the first user US1. A reason why the radio field intensity of Wi-Fi (trade name) is utilized for locating the position of the first user US1 is that the GNSS receiver 115 cannot receive radio waves within a room such as the eating establishment Rst in some cases.

The first task completion determination unit 157 determines whether the first task is completed or not within a predetermined period of time (step S140). Specifically, the first task completion determination unit 157 determines whether the position of the target matches the position of the first user US1 or not. Additionally, the first task completion determination unit 157 determines whether the operation of the first user US1 matches an operation for the first task stored in an "operation for the task" in the task data storage unit 125 or not. Further, when the position of the target matches the position of the first user, and the operation of the first user US1 is identical to the operation for the first task, the first task completion determination unit 157 determines that the first task is completed (step S140: YES), and as illustrated in FIG. 11 and FIG. 12, the above step S100 is executed.

On the other hand, in the above step S140, when the position of the target does not match the position of the first user US1, or when the operation of the first user US1 is not identical to the operation for the first task, the first task completion determination unit 157 determines that the first task is not completed (step S140: NO), and step S145 described later is executed. When the first task is not completed, a user other than the first user US1 needs to perform the first task. Thus, in the present exemplary embodiment, this case is treated as though a task (second task) has occurred where a user other than the first user US1 needs to perform. Accordingly, step S140 can be understood as a process for determining whether a second task occurs or not by the second task occurrence determination unit 167. In other words, when the first task is determined to be completed (step S140: YES), the second task is determined not to occur, and when the first task is determined not to be completed (step S140: NO), the second task is determined to have occurred. Note that, the target, the operation, and the like, of the second task are identical to those of the first task.

The position acquisition unit 171 acquires respective positions of a second user and a third user via the wireless communication unit 117, and the load condition acquisition unit 173 acquires respective load conditions of the second user and the third user via the wireless communication unit 117 (step S145).

The performer determination unit 175 determines a performer of the second task, by utilizing the positions and load conditions of the respective users (step S150). Specifically, the performer determination unit 175 expresses the positions and the loads as scores by using predetermined weighting, and determines a user with the lowest score as a performer of the second task. For example, as for weighting of a position, a score is set to increase as a distance from a position of a user to a position of a target decreases. Further, for example, a score is set to increase as a load of a user lowers. In the example illustrated in FIG. 1, a position of the second user US2 is closer to the position of the customer Tg1 as a target of the second task than a position of the third user US3. Additionally, the second user US2 is performing the "carry dishes" task, and the third user US3 is not performing a task. Accordingly, in step S150, the third user US3 is determined as the performer of the second task.

As illustrated in FIG. 12, the related information providing unit 159 provides second related information to the performer of the second task (step S155). Process contents of step S155 are similar to those of the above step S130. The second task completion determination unit 169 acquires a second task completion notification from the performer of the second task, via the wireless communication unit 117 (step S160). The second task completion determination unit 169 determines whether the second task is completed or not (step S165). Specifically, the second task completion determination unit 169, when the second task completion notification is not acquired, determines that the second task is not completed (step S165: NO), and the above step S160 is executed. On the other hand, when the second task completion notification is acquired, the second task completion determination unit 169 determines that the second task is completed (step S165: YES), and as illustrated in FIG. 11 and FIG. 12, the above step S100 is executed.

Figure 14:
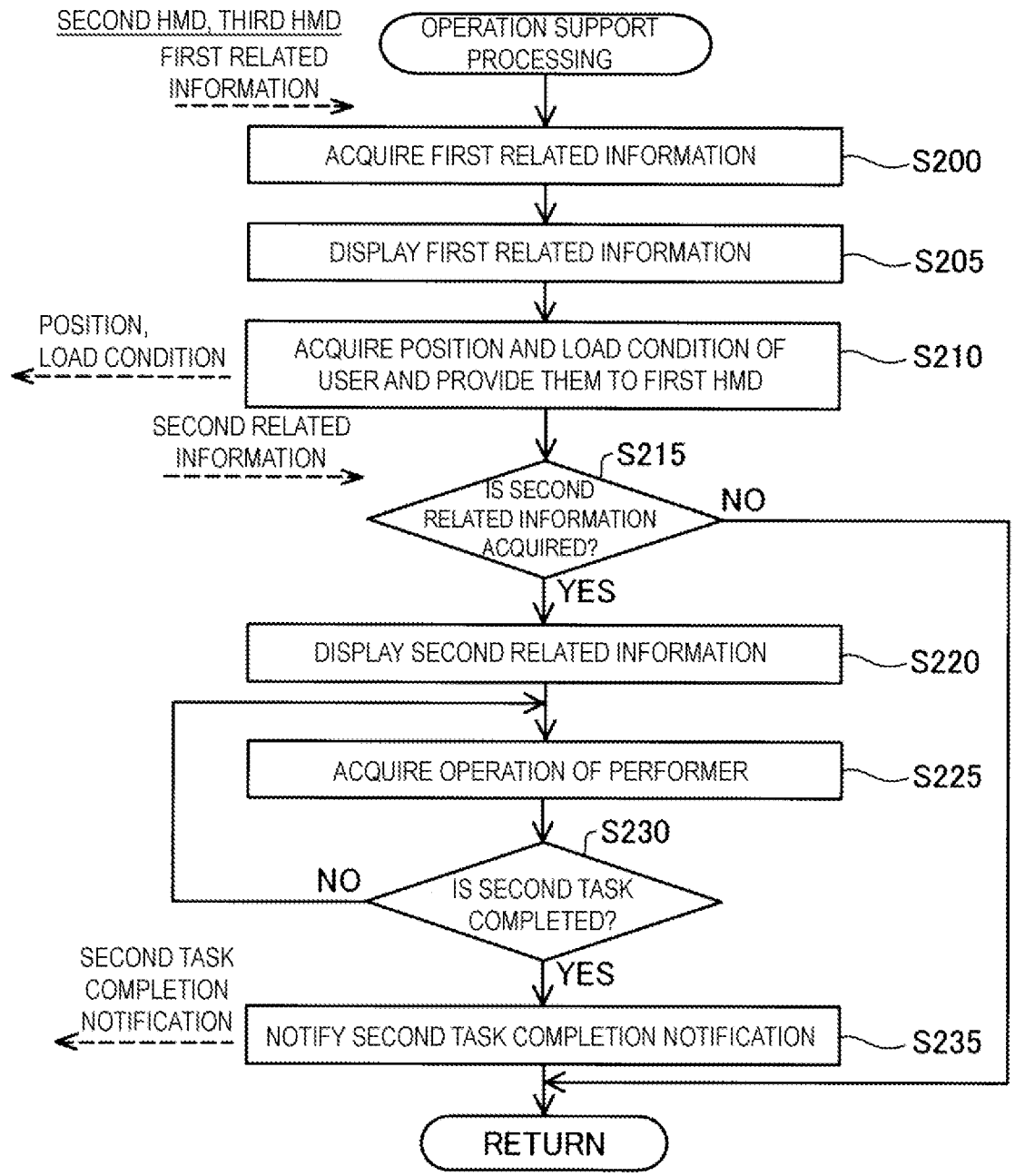
FIG. 14 is a flowchart illustrating how operation support processing proceeds in a second HMD and a third HMD.

FIG. 14 is a flowchart illustrating how the operation support processing proceeds in the second HMD 200 and the third HMD 300. The operation support processing in the second HMD 200 and the third HMD 300 is started when the "Operation Support" menu illustrated in FIG. 10 is executed to activate the "Operation Support" application. In the second HMD 200, the related information acquisition unit 457 acquires the first related information from the first HMD 100, via the wireless communication unit 117 (step S200). Similarly, in the third HMD 300, the related information acquisition unit 557 acquires the first related information from the first HMD 100, via the wireless communication unit 117 (step S200).

In the second HMD 200, the second display controller 455 controls such that the first related information is displayed (step S205). Similarly, in the third HMD 300, the third display controller 555 controls such that the first related information is displayed (step S205). Note that, process contents of Step S205 are similar to those of the above-mentioned step S105.

In the second HMD 200, the position providing unit 459 and the load condition providing unit 461 acquire a position and a load condition of the second user US2 respectively, and provide to the first HMD 100 via the wireless communication unit 117 (step S210). Similarly, in the third HMD 300, the position providing unit 559 and the load condition providing unit 561 acquire a position and a load condition of the third user US3 respectively, and provide to the first HMD 100 via the wireless communication unit 117 (step S210).

In the second HMD 200, the related information acquisition unit 457 determines whether second related information is acquired from the first HMD 100 or not (step S215). When the second task occurs in the first HMD 100, the performer of the second task is determined in the first HMD 100 (the above step S150 illustrated in FIG. 11), and the determined performer is provided with the second related information (the above step S155 illustrated in FIG. 12). Accordingly, the related information acquisition unit 457, by determining whether the second related information is acquired or not, determines whether the second user US2 of the second HMD 200 is the performer of the second task or not. Similarly, in the third HMD 300, the related information acquisition unit 557 determines whether the second related information is acquired from the first HMD 100 or not (step S215).

In the present exemplary embodiment, as described above, the third user US3 is determined as the performer of the second task. Thus, the second HMD 200 is not provided with the second related information, and the third HMD 300 is provided with the second related information. Accordingly, in the second HMD 200, the second related information is determined not to be acquired in the above step S215 (step S215: NO), and the above step S200 is executed. On the other hand, in the third HMD 300, the second related information is determined to be acquired (step S215: YES), and the step S220 described later is executed. Note that, when the second user US2 is determined as the performer of the second task, step S220 described later and subsequent processes are executed in the second HMD 200 as well.

The third display controller 555 controls such that the second related information is displayed (step S220). The process contents of Step S220 are similar to those of the above-mentioned step S200.

Figure 15:
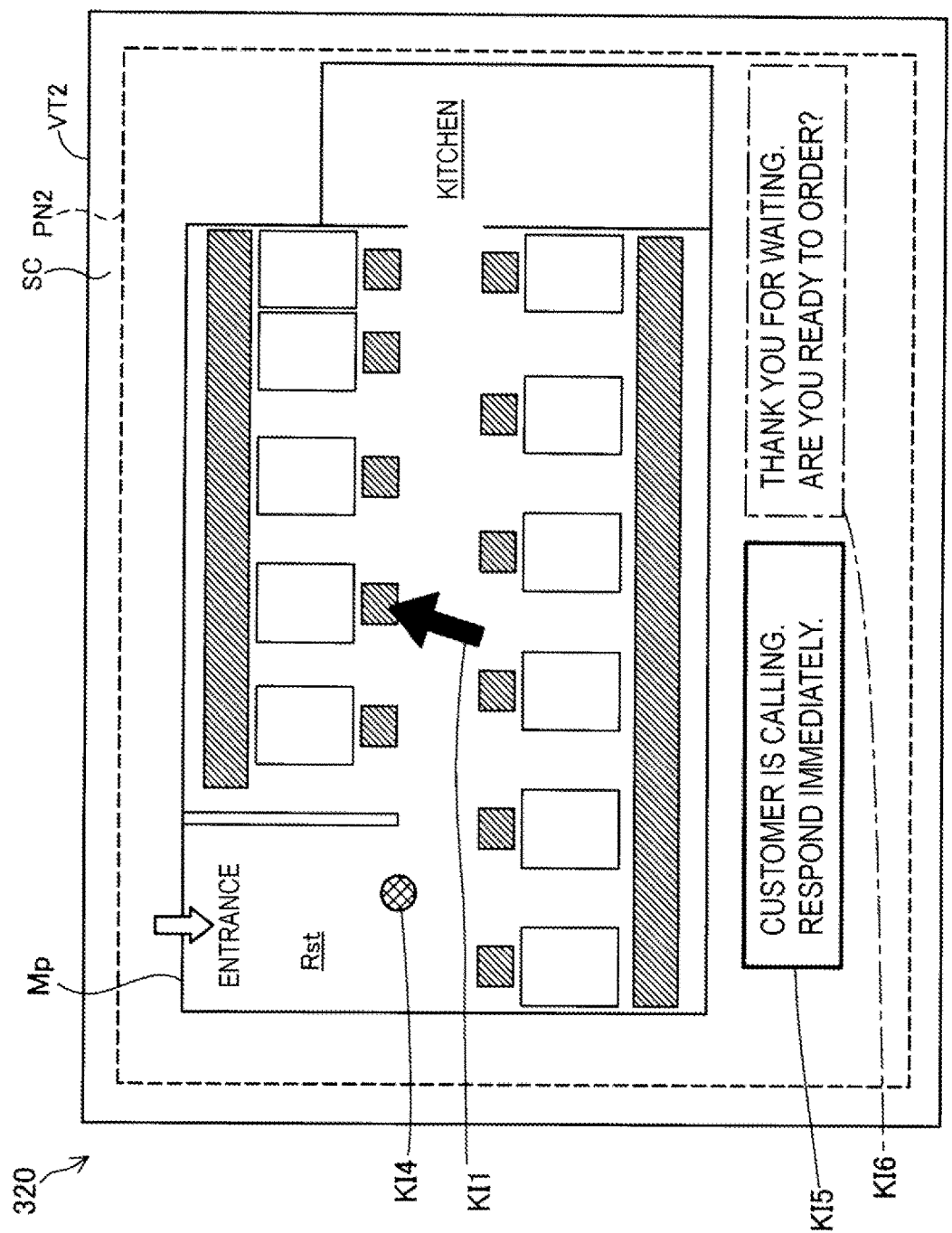
FIG. 15 is an explanatory diagram schematically illustrating a field of view of a third user after the execution of step S225.

FIG. 15 is an explanatory diagram schematically illustrating a field of view VT2 of a third user US3 after execution of step S225. In FIG. 15, the third image display unit 320 of the third HMD 300 is illustrated. In FIG. 15, illustration of the external scene SC of the field of view VT2 is omitted. As illustrated in FIG. 15, related information images KI4, KI5, and KI6 are displayed, in a display region PN2, in addition to the in-store map image Mp of the eating establishment Rst and the related information image KI1 displayed in the display region PN1 of the first HMD 100 illustrated in FIG. 13.

As illustrated in FIG. 15, the related information image KI4 is an image denoting a position of the third user US3 as the performer of the second task by a circle. The related information image KI5 is a text image indicating contents of the second task. The related information image KI5 is different from the related information image KI3 illustrated in FIG. 13, and the contents of the second task and an operation that the third user US3 needs to actually perform are expressed as characters, that is, A "customer is calling. Respond to the customer immediately." is displayed. In the related information image KI6, when the second task ("take order" task) is actually performed, words to say to the customer Tg1 as the target of the task are expressed, and "Thank you for waiting. Are you ready to order?" is displayed.

As described above, the skill level of the third user US3 is lower than the skill level of the first user US1. Accordingly, by differentiating display modes of related information according to a skill level of a performer of a task, a user with a relatively low skill level can easily perform a task, and blocking a field of view with unnecessary information can be suppressed for a user with a relatively high skill level.

As illustrated in FIG. 14, the second operation detector 563 acquires an operation of the third user US3 as the performer of the second task (step S225). Specifically, as in the above step S135, the second operation detector 563 utilizes a detection result of the six-axis sensor 111 of the third HMD 300, to acquire the operation of the third user US3. Additionally, the second operation detector 563 utilizes the radio field intensity of Wi-Fi (trade name) to locate the position of the third HMD 300, that is, the position of the third user US3.

The second task completion determination unit 565 determines whether the second task is completed or not (step S230). Specifically, as in the above step S140, the second task completion determination unit 565 determines whether the operation of the third user US3 at the position of the target of the second task, that is the position of the target of the first task, is an identical operation to the operation for the second task stored in the task data storage unit 125 or not. When the operation of the third user US3 at the position of the target of the first task is not identical to the operation for the second task, the second task completion determination unit 565 determines that the second task is not completed (step S230: NO), and the above step S225 is executed. On the other hand, when the operation of the third user US3 at the position of the target of the first task is identical to the operation for the second task, the second task completion determination unit 565 determines that the second task is completed (step S230: YES), and the second task completion determination unit 565 notifies the first HMD 100 of a second task completion notification, via the wireless communication unit 117 (step S235).

According to the first HMD 100 of the present exemplary embodiment described above, in the first HMD 100, when the first task is determined to have occurred, the related information images KI1, KI2, and KI3 are displayed. Additionally, the second HMD 200 and the third HMD 300 are provided with the related information, and in the second HMD 200 and the third HMD 300, the acquired related information is displayed. Accordingly, the user US1 of the first HMD 100, the user US2 of the second HMD 200, and the user US3 of the third HMD 300 can easily recognize that the first task occurs.

Further, when the operation of the first user US1 at the position of the customer Tg1 as the target of the first task is identical to a predetermined operation, the first task is determined to be completed, and thus whether the first task is completed or not can easily be determined. In addition, when the first task is determined not to be completed, the second task is determined to have occurred, and whether the second task occurs or not can easily be determined, and can be determined precisely. Further, based on the respective positions of the second user US2 and the third user US3, and the respective load conditions of the second user US2 and the third user US3, the performer of the second task is determined, and thus an appropriate user can be determined as a performer within the operation support system 1. In addition, since the third image display unit 320 of the third HMD 300 worn by the third user US3 as the performer of the second task is controlled to display the related information images KI1, KI4, KI5, and KI6, the performer of the second task is allowed to know information of the second task.

B. Second Exemplary Embodiment

The operation support system 1 and the transmissive head mounted display apparatuses 100, 200, and 300 according to a second exemplary embodiment are similar to the operation support system 1 and the transmissive head mounted display apparatuses 100, 200, and 300 in the first exemplary embodiment, respectively, and thus detailed description of the system and the apparatuses will be omitted. A processing procedure of operation support processing in the second exemplary embodiment is identical to the processing procedure of the operation support processing in the first exemplary embodiment.

Figure 16:
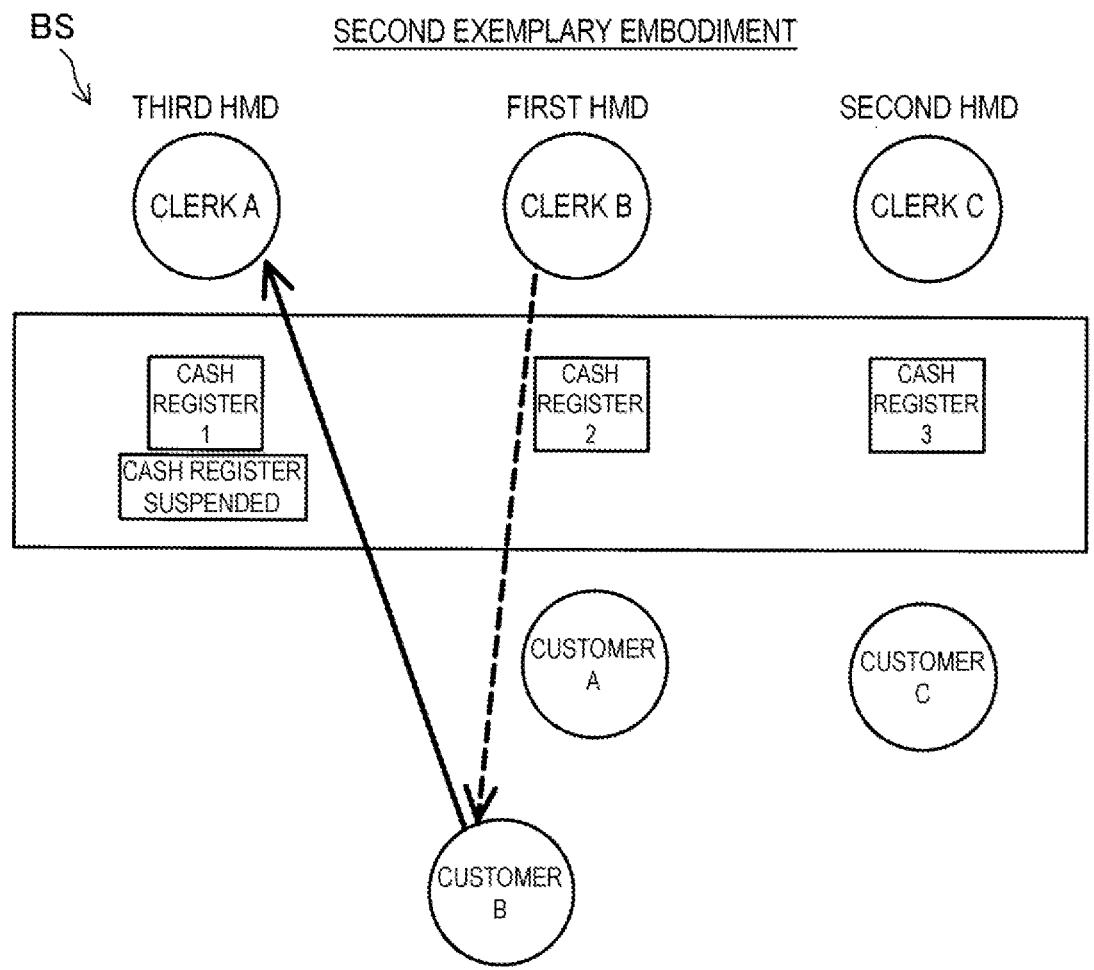
FIG. 16 is an explanatory diagram schematically illustrating a state where operation support processing in a second exemplary embodiment is performed.

FIG. 16 is an explanatory diagram schematically illustrating a state where the operation support processing in the second exemplary embodiment is performed. In the second exemplary embodiment, the operation support system 1 runs at a rental video shop BS. As illustrated in FIG. 16, three clerks A, B, and C are processing a payment operation, at cash registers 1, 2, and 3, respectively. In the second exemplary embodiment, the clerk A corresponds to the third user US3 in the first exemplary embodiment, the clerk B corresponds to the first user US1 in the first exemplary embodiment, and the clerk C corresponds to the second user US2 in the first exemplary embodiment. Note that, in FIG. 16, although illustration is omitted, each of the clerks A, B, and C wears the HMD, and the clerk A wears the third HMD 300, the clerk B wears the first HMD 100, and the clerk C wears the second HMD 200.

As illustrated in FIG. 16, the clerk A is performing a "vouching" task, while suspending the cash register 1. The clerk B is performing a "payment processing" task for a customer A at the cash register 2. The clerk C is performing the "payment processing" task for a customer C at the cash register 3. Note that, in the second exemplary embodiment, a load of the "payment processing" task is set to be higher, when the "payment processing" task is compared with the "vouching" task. As illustrated in FIG. 16, the customer B is in line behind the customer A. A state is illustrated in which as an arrow of a solid line denotes, the customer B is looking at the clerk A, and as an arrow of a dashed line denotes, in a field of view direction of the clerk B, the customer B is looking at the clerk A.

Here, in the second exemplary embodiment, as for the "payment processing" task, a state where a customer as a target of the task is looking at a clerk for a predetermined period of time is defined as a "state of the target" in advance. Accordingly, in the first HMD 100 worn by the clerk B, when the operation support processing illustrated in FIG. 11 and FIG. 12 is executed, a state is identified where the customer B is looking at the clerk A for the predetermined period of time, from the captured images acquired by the camera 61 of the first HMD 100, in the above-mentioned step S100 to step S115, and the "payment processing" task (first task) is determined to have occurred. Subsequently, the above-mentioned step S125 is executed, and first related information is displayed on the first image display unit 20 of the first HMD 100. As described above, the clerk B is performing the "payment processing" task for the customer A, and thus cannot perform the first task. Accordingly, in the above-mentioned step S140, the first task is determined not to be completed (step S140: NO), and a second task ("payment processing" task) occurs.

Subsequently, the above-mentioned step S150 is executed, and a performer of the second task is determined, based on respective positions and load conditions of the clerk A and the clerk C. Specifically, as illustrated in FIG. 16, the position of the clerk A is closer to a position of the customer B as the target of the task than the position of the clerk C. Additionally, the clerk C is performing the "payment processing" task for the customer C, and thus has a higher load than that of the clerk A. Accordingly, the clerk A is determined as the performer of the second task.

As illustrated in FIG. 14, in the third HMD 300 worn by the clerk A, the above-mentioned steps S215 and S220 are executed, and second related information is displayed on the third image display unit 320 of the third HMD 300. Subsequently, the clerk A can utilize the displayed second related information to perform the "payment processing" task for the customer B.

According to the HMD 100 of the second exemplary embodiment described above, the same effects as those in the first exemplary embodiment can be exerted.

C. Third Exemplary Embodiment

The operation support system 1 and the transmissive head mounted display apparatuses 100, 200, and 300 according to a third exemplary embodiment are similar to the operation support system 1 and the transmissive head mounted display apparatuses 100, 200, and 300 in the first exemplary embodiment, respectively, and thus detailed description of the system and the apparatuses will be omitted. A processing procedure of operation support processing in the third exemplary embodiment is identical to the processing procedure of the operation support processing in the first exemplary embodiment.

Figure 17:
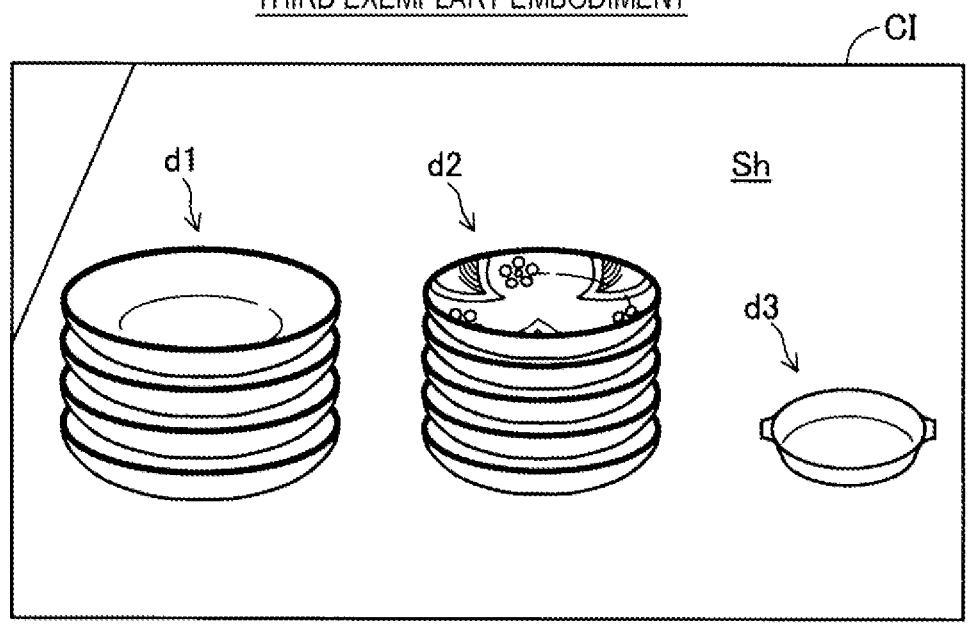
FIG. 17 is an explanatory diagram schematically illustrating a state where operation support processing in a third exemplary embodiment is performed.

FIG. 17 is an explanatory diagram schematically illustrating a state where the operation support processing in the third exemplary embodiment is performed. In the third exemplary embodiment, the operation support system 1 runs inside the eating establishment Rst, as in the first exemplary embodiment. In FIG. 17, a captured image CI acquired in the first HMD 100 worn by the first user US1 in the above-mentioned step S100, is schematically illustrated. As illustrated in FIG. 17, three kinds of plates d1, d2, and d3 contained in a cupboard Sh are reflected in the captured image CI. The number of remaining plates d3 is one.

In the third exemplary embodiment, when a state where the number of plates is lower than a predetermined number of plates is detected, a "collect plates" task is determined to have occurred. The "predetermined number of plates" is three plates, for example. Note that, for the predetermined number of plates, any other number of plates may be set instead of three plates. Note that, in the third exemplary embodiment, kinds, total numbers, and the above predetermined numbers of plates to be used for respective menus are stored in the task data storage unit 125 in advance.

As illustrated in FIG. 11, when the above-mentioned steps S105 to S115 are executed in the first HMD 100, and the "collect plates" task is determined to have occurred, the first related information is displayed on the first image display unit 20 of the first HMD 100 (the above-mentioned step S125).

Figure 18:
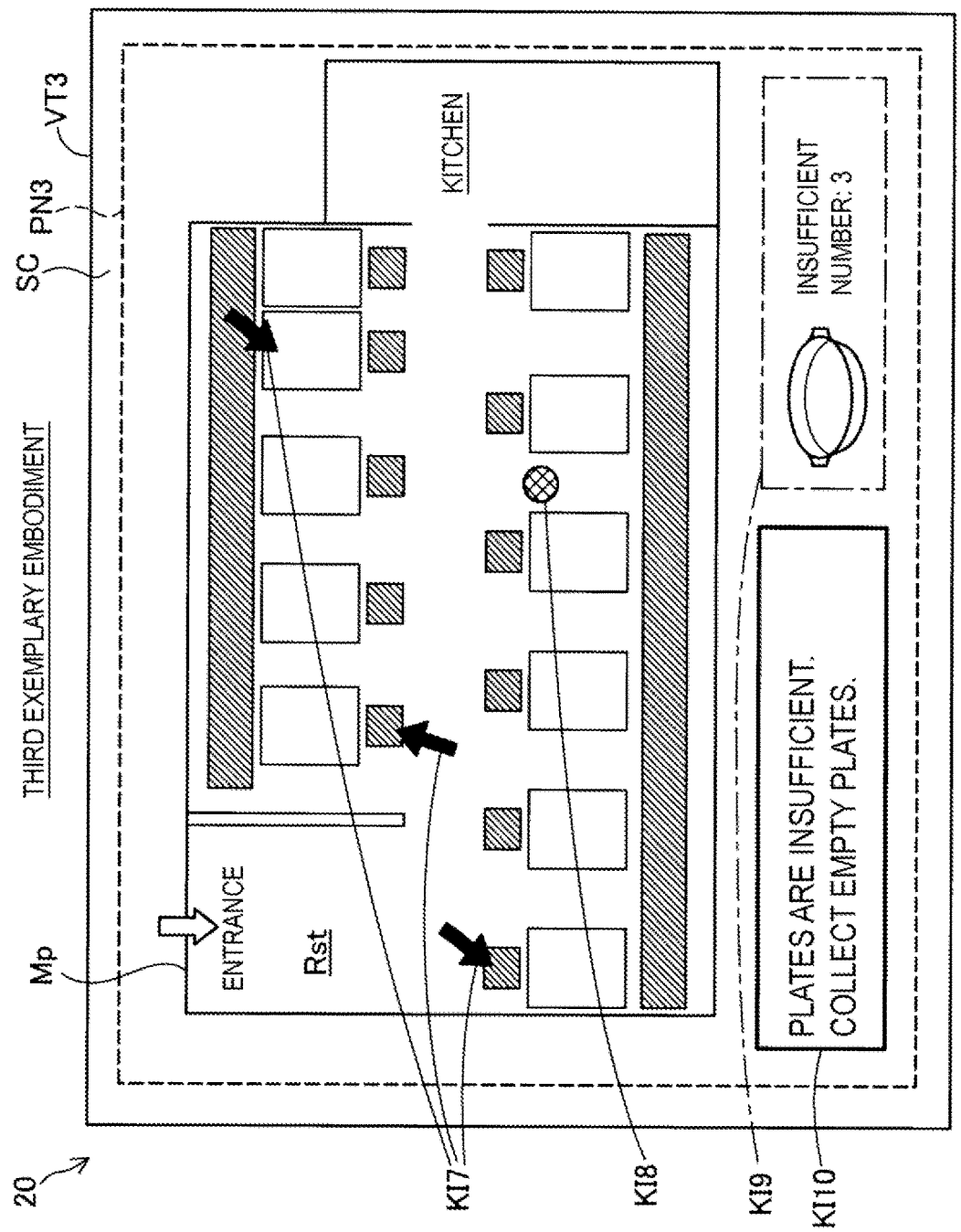
FIG. 18 is an explanatory diagram schematically illustrating the field of view of the first user after the execution of step S125.

FIG. 18 is an explanatory diagram schematically illustrating a field of view VT3 of a first user US1 after execution of step S125. In FIG. 18, the first image display unit 20 of the first HMD 100 is illustrated. In FIG. 18, illustration of the external scene SC of the field of view VT3 is omitted. As illustrated in FIG. 18, the in-store map image Mp of the eating establishment Rst, and related information images KI7, KI8, KI9, and KI10 are displayed, in a display region PN3. The related information image KI7 is an image denoting a position of a customer who orders a menu corresponding to an insufficient plate by an arrow. The related information image KI8 is an image denoting a position of the first user US1 by a circle. Note that, the related information image KI8 is identical to the related information image KI2 illustrated in FIG. 13. The related information image KI9 is an image denoting the number of insufficient plates. The related information image KI10 is an image indicating the "collect plates" task, and "plates are insufficient, collect empty plates" is displayed.

As illustrated in FIG. 11, the above step S135 and step S140 are executed in the first HMD 100, and whether the "collect plates" task is performed by the first user US1 or not is determined. At this time, for example, by determining whether a plate to be collected is detected in a captured image by the camera 61 of the first HMD 100 or not, and whether an operation of carrying the plate to be collected to a washing place by the first user US1 is detected or not, whether the "collect plates" task is performed by the first user US1 or not can be determined.

When the "collect plates" task is not completed by the first user US1 (the above-mentioned step S140: NO), the above-mentioned step S145 and step S150 are executed, and either the second user US2 or the third user US3 is determined as a performer of the "collect plates" task. Subsequently, second related information is displayed on the image display unit of the HMD worn by the performer, and the performer can utilize the displayed second related information to perform the "collect plates" task.

According to the above-described HMD 100 of the third exemplary embodiment, the same effects as those in the first exemplary embodiment can be exerted.

D. Other Exemplary Embodiments

D1. Another Exemplary Embodiment 1

In each of the exemplary embodiments, the task, the place to perform the task, the target of the task, the state of the target, and the related information are not limited to those of the above described examples. According to the place to perform the task or the target of the task, various states of the target, or related information may be adopted.

FIG. 19 is an explanatory diagram illustrating an example of task data. Task data TL list a place to perform a task, a target of the task, a state of the target, and related information, among respective data stored in the task data storage unit 125 in advance. As indicated in the uppermost row of FIG. 19, when a place to perform the task is a "FOOTBALL STADIUM (AT ENTRANCE)", a target of the task is an "audience", a state of the target is a state of "looking for something", and related information is "GUIDANCE TO RESERVED SEAT". As indicated in the second row of FIG. 19, when a place to perform the task is a "FOOTBALL STADIUM (AT HALF TIME)", a target of the task is an "AUDIENCE", a state of the target is a state of "LOOKING FOR SOMETHING", and related information is "GUIDANCE TO RESTROOM". As in the above two examples, when the places to perform the task are identical but usages of the respective places to perform the task change depending on periods of time, the pieces of related information may be differentiated. In this way, more appropriate related information can be provided for the user.

As indicated in the third row of FIG. 19, when a place to perform the task is a "DINING ROOM", a target of the task is a "USER AT CUSTOMER SERVICE AREA", a state of the target is a state of "clearing away plates", and related information is "GUIDANCE TO SERVICE HATCH FOR PLATES". As indicated in the fourth row of FIG. 19, when a place to perform the task is a "dining room", a target of the task is a "USER AT CUSTOMER SERVICE AREA", and a state of the target is a state of "CLEARING AWAY PLATES", and related information is "HOW TO WASH PLATES" and "GUIDANCE TO PLATE STORAGE AREA". As indicated in the fifth row of FIG. 19, when a place to perform the task is an "EATING ESTABLISHMENT", a target of the task is a "CUSTOMER AT ENTRANCE", a state of the target is "THE NUMBER OF CUSTOMERS", and related information is "GUIDANCE TO UNOCCUPIED TABLE".

As indicated in the sixth row of FIG. 19, when a place to perform the task is an "ELECTRICAL APPLIANCE STORE", a target of the task is a "CUSTOMER AT SALES FLOOR FOR AIR CONDITIONERS", and a state of the target is a state of "LOOKING AT COMMERCIAL PRODUCT", and related information is "GUIDANCE FOR SELLING POINTS OF TARGET COMMERCIAL PRODUCT". As indicated in the seventh row of FIG. 19, when a place to perform the task is an "ELECTRICAL APPLIANCE STORE", a target of the task is a "CUSTOMER AT SALES FLOOR FOR AIR CONDITIONERS", a state of the target is a state of "LOOKING AT COMMERCIAL PRODUCT", and related information is "INQUIRY POINT TO CUSTOMER" SUCH AS A PRICE, A ROOM SIZE, AN ELECTRICITY COST AND THE LIKE.

As indicated in the eighth row of FIG. 19, when a place to perform the task is a "CRAM SCHOOL", a target of the task is a "STUDENT", a state of the target is a state where "HAND STOPS ON NOTEBOOK", and related information is "CLUE FOR STUDENT TO BE INSTRUCTED" such as how to solve the problem, or the like. As indicated in the ninth row of FIG. 19, when a place to perform the task is a "BASEBALL STADIUM", a target of the task is an "AUDIENCE", a state of the target is a state of "LOOKING AROUND WITH BEER IN HAND", and related information is "GUIDANCE FOR SNACKS" such as recommending popcorn, or the like.

As indicated in the tenth row of FIG. 19, when a place to perform the task is a "DEPARTMENT STORE", a target of the task is a "CUSTOMER AT SALES FLOOR FOR CLOTHES", a state of the target is a state of "LOOKING FOR SOMETHING WHILE HOLDING COMMERCIAL PRODUCT AND WALLET IN HAND", and related information is "GUIDANCE TO CASHIER". Note that, when the state of the target is a state of "looking for something with only a commercial product in hand", related information may be "GUIDANCE TO FITTING ROOM". As indicated in the eleventh row of FIG. 19, when a place to perform the task is the "MATSUMOTO CASTLE", a target of the task is a "VISITOR AT OTE GATE", a state of the target is a state of "READING MAP" or a "MOVING DIRECTION" OF VISITOR, and related information is "GUIDANCE TO ADMISSION TICKET COUNTER".

As in the above-mentioned examples, for various tasks expected to be performed at a place to perform the task, a target of the task, a state of the target, contents of related information, or the like, may be arbitrarily defined in advance. Additionally, in addition to the above-mentioned examples, for example, states of a target of the task may be differentiated, according to the skill levels of respective users. Specifically, in the above-mentioned first exemplary embodiment, when the first user US1 is an expert with a relatively high skill level, and a state where the customer Tg1 is looking at the first user US1 for a predetermined period of time is detected from captured images, the first task may not be determined to occur. In this configuration, according to the skill levels of the respective users US1, US2, and US3, skill levels stored in the task data storage unit 125 may be changed. Such a configuration also produces effects similar to the effects of the exemplary embodiments described above.

D2. Another Exemplary Embodiment 2

In the above-mentioned first exemplary embodiment, the second related information is displayed only on the third image display unit 320 of the third user US3 as the performer of the second task, but, in addition to this, the information may be displayed on the first image display unit 20 of the first user US1, and the second image display unit 220 of the second user US2. Such a configuration produces effects similar to the effects of the first exemplary embodiment described above.

D3. Another Exemplary Embodiment 3

In each of the above-mentioned exemplary embodiments, the camera 61 is disposed on the front frame 27 of the first image display unit 20, and configured to capture at least part of an external scene (real space), in a field of view direction visually recognized by the first user US1, but the present disclosure is not limited to this. For example, the camera 61 may be disposed on both the ends EL and ER of the first HMD 100, and may be configured to capture an opposite direction to the direction visually recognized by the first user US1. In this configuration, even when a task occurs in a direction is not visually recognized by the first user US1, occurrence of the task can be detected. Additionally, for example, the camera 61 may be a 360-degree camera, instead of a monocular camera. In this configuration, more information can be acquired at one image capturing, compared to a configuration where the camera 61 is a monocular camera. Further, the camera 61 may be a capturing device configured to detect brightness, distance, and temperature. Such a configuration also produces effects similar to the effects of the exemplary embodiments described above.

D4. Another Exemplary Embodiment 4

In the above-mentioned first exemplary embodiment, the performer of the second task is determined based on the respective positions and the load conditions of the second user US2 and the third user US3, but the present disclosure is not limited to this. For example, the performer of the second task may be determined based on the skill level for the second task of the respective users US2 and US3. Specifically, when respective weighting (scores) of positions and loads of the users US2 and US3 are identical, a user with a higher skill level for the second task may be determined as the performer of the second task. Additionally, for example, the performer of the second task may be determined according to gender, age, or the like, of a target of the task. Specifically, when a target of the task is a female or a child, the female user may be determined as the performer of the second task. Such a configuration produces effects similar to the effects of the first exemplary embodiment described above.

D5. Another Exemplary Embodiment 5

In each of the above-mentioned exemplary embodiments, the first task occurrence determination unit 155 may be configured to determine that the first task does not occur, in a state where the target of the first task is separated from the first user US1 by equal to or more than a predetermined distance. For example, in the first exemplary embodiments, in a case where a distance between the first user US1 and the customer Tg1 is equal to or larger than a predetermined distance, the first task may be determined not to occur, or the first task may be determined to occur. For example, the above-mentioned "predetermined distance" is three meters. However, the predetermined distance may be any other distance, instead of three meters. Such a configuration also produces effects similar to the effects of the exemplary embodiments described above.

D6. Another Exemplary Embodiment 6

In each of the above-mentioned exemplary embodiments, the respective positions of the users US1, US2, and US3, are located by utilizing the radio field intensity of Wi-Fi (trade name), but the present disclosure is not limited to this. For example, in the first exemplary embodiment, respective positions of the users US1, US2, and US3 may be located by utilizing a captured image of a monitoring camera installed inside the eating establishment Rst. Further, for example, in a case of a place where a radio wave of the GNSS receiver 115 can be received, each of the users US1, US2, and US3 may be located by utilizing latitude and longitude acquired from the GNSS receiver 115. Such a configuration also produces effects similar to the effects of the exemplary embodiments described above.

D7. Another Exemplary Embodiment 7

In each of the above-mentioned exemplary embodiments, a display device different from the HMDs 100, 200, and 300 may be configured to be controlled to display the first related information and the second related information. For example, in the first exemplary embodiment, in a case where a manager of the restaurant staffs at the eating establishment Rst utilizes a tablet terminal to manage a state of task performance of each restaurant staff, the first related information and the second related information may be displayed on a display screen of this tablet terminal. In this configuration, the manager can easily check the state of task performance, and the skill level for the task of each restaurant staff. Such a configuration also produces effects similar to the effects of the exemplary embodiments described above.

D8. Another Exemplary Embodiment 8

In each of the above-mentioned exemplary embodiments, the operation support system 1 includes the three HMDs 100, 200, and 300, but the number of the HMDs included in the operation support system 1 may be of any other number, instead of three. In other words, in general, the operation support system 1 also produces effects similar to the effects of the exemplary embodiments described above, as long as a configuration is adopted that includes a plurality of transmissive head mounted display apparatuses including a first transmissive head mounted display apparatus configured to be worn by a first user, and one or more second transmissive head mounted display apparatuses configured to be worn by one or more second users different from the first user.

D9. Another Exemplary Embodiment 9

In the above-mentioned second exemplary embodiment, whether the "payment processing" task for the customer C as the target of the task is completed, or not may be determined by allowing a POS system to cooperate. Specifically, by adopting a configuration where the control devices 10, 210, and 310 of the respective HMDs 100, 200, and 300, and a POS system can perform wireless communication, by adopting a configuration where each of the control function units 150, 450, and 550 can accept input to the POS system, and by checking that the input to the POS system is payment processing input for the customer C, whether the "payment processing" task is completed or not, can be determined. Such configuration also exerts effects similar to those in the above-mentioned second exemplary embodiment.

D10. Another Exemplary Embodiment 10

In each of the above-mentioned exemplary embodiments, the first HMD 100 and the second HMD 200 may have an identical configuration. Specifically, the first control function unit 150 of the first HMD 100 may include the second display controller 455, the related information acquisition unit 457, the position providing unit 459, and the load condition providing unit 461. The second control function unit 450 of the second HMD 200 may include the first display controller 147, the target identifying unit 153, the first task occurrence determination unit 155, the first task completion determination unit 157, the related information providing unit 159, the line-of-sight detector 161, the target position locating unit 163, the first operation detector 165, the second task occurrence determination unit 167, the second task completion determination unit 169, the position acquisition unit 171, the load condition acquisition unit 173, and the performer determination unit 175.

Further, for example, the first HMD 100 and the third HMD 300 may have an identical configuration. Specifically, the first control function unit 150 of the first HMD 100 may include the third display controller 555, the related information acquisition unit 557, the position providing unit 559, the load condition providing unit 561, the second operation detector 563, and the second task completion determination unit 565. The third control function unit 550 of the third HMD 300 may include the first display controller 147, the target identifying unit 153, the first task occurrence determination unit 155, the first task completion determination unit 157, the related information providing unit 159, the line-of-sight detector 161, the target position locating unit 163, the first operation detector 165, the second task occurrence determination unit 167, the second task completion determination unit 169, the position acquisition unit 171, the load condition acquisition unit 173, and the performer determination unit 175.

In addition to this, for example, the second HMD 200 and the third HMD 300 may have an identical configuration, or all of the first HMD 100, the second HMD 200, and the third HMD 300 may have exactly an identical configuration. Such a configuration also produces effects similar to the effects of the exemplary embodiments described above.

D11. Another Exemplary Embodiment 11

In each of the above-mentioned exemplary embodiments, the performer of the second task is different from that of the first task, but instead of this, or in addition to this, the second task may have task contents different from those of the first task. For example, when the first task is the "take order" task, the second task may be a "take order according to the predetermined procedure" task. In other words, in general, effects similar to the effects of the exemplary embodiments described above are produced, as long as the second task is a task different from the first task.

D12. Another Exemplary Embodiment 12

In each of the above-mentioned exemplary embodiments, the performer determination unit 175 may be configured to determine the performer of the second task by utilizing predetermined task priority. The "priority" can be defined according to an occurrence frequency of the second task. For example, low priority may be set when the occurrence frequency of the second task is relatively low, and high priority may be set when the occurrence frequency of the second task is relatively high. This priority is stored in the task data storage unit 125 in advance. For example, in the above-mentioned step S150, the performer determination unit 175, need not determine the performer of the second task, and may allow the first user US1 to perform the second task, when the priority of the second task is low. Further, for example, the performer determination unit 175 may be configured to utilize both the priority of the second task and the respective load conditions of the users, to determine the performer. Such a configuration also produces effects similar to the effects of the exemplary embodiments described above.

D13. Another Exemplary Embodiment 13

In each of the above-mentioned exemplary embodiments, the respective display modes of the first related information and the second related information are not limited to the respective examples illustrated in FIG. 13, FIG. 15, and FIG. 18. For example, the related information may be displayed in a 3D (stereo) manner. Additionally, for example, the related information may be displayed so as to move, to flash like a moving image, or to blink. Such a configuration also produces effects similar to the effects of the exemplary embodiments described above.

D14. Another Exemplary Embodiment 14

In each of the above-mentioned exemplary embodiments, the HMDs 100, 200, and 300 are transmissive head mounted display apparatuses. However, instead of these, a video see-through type HMD may be used. Such a configuration also produces effects similar to the effects of the exemplary embodiments described above.

D15. Another Exemplary Embodiment 15

In the exemplary embodiments described above, the OLED units 221 and 241 are configured to include the OLED panels 223, 243 and the OLED drive circuits 225 and 245 that respectively drive the OLED panels 223 and 243, and each of the OLED panels 223 and 243 is a self-light-emitting display panel including light-emitting elements that emit light by organic electro-luminescence. However, the present disclosure is not limited to this. Furthermore, each of the OLED panels 223 and 243 includes a plurality of pixels arranged in a matrix, and each of the plurality of pixels corresponds to a unit including one element of R, one element of G, and one element of B. However, the present disclosure is not limited to this. For example, each of the right display unit 22 and the left display unit 24 may be configured as a video element that includes an OLED panel serving as a light source unit and a modulation element configured to modulate light emitted by the light source unit to output imaging light including a plurality of colors of light. Note that the modulation device for modulating the light emitted by the OLED panel is not limited to a configuration in which a transmission-type liquid crystal panel is adopted. For example, a reflective liquid crystal panel may be used instead of the transmission-type liquid crystal panel, or a digital micro-mirror device or a laser scan type laser retinal projection HMD may be used. Such a configuration also produces effects similar to the effects of the exemplary embodiments described above.

D16. Another Exemplary Embodiment 16

In each of the above-mentioned exemplary embodiments, when the first task is determined to have occurred, the second HMD 200 and the third HMD 300 are provided with the first related information, but the second HMD 200 and the third HMD 300 need not be provided with the first related information. Such a configuration also produces effects similar to the effects of the exemplary embodiments described above.

D17. Another Exemplary Embodiment 17

Figure 20:
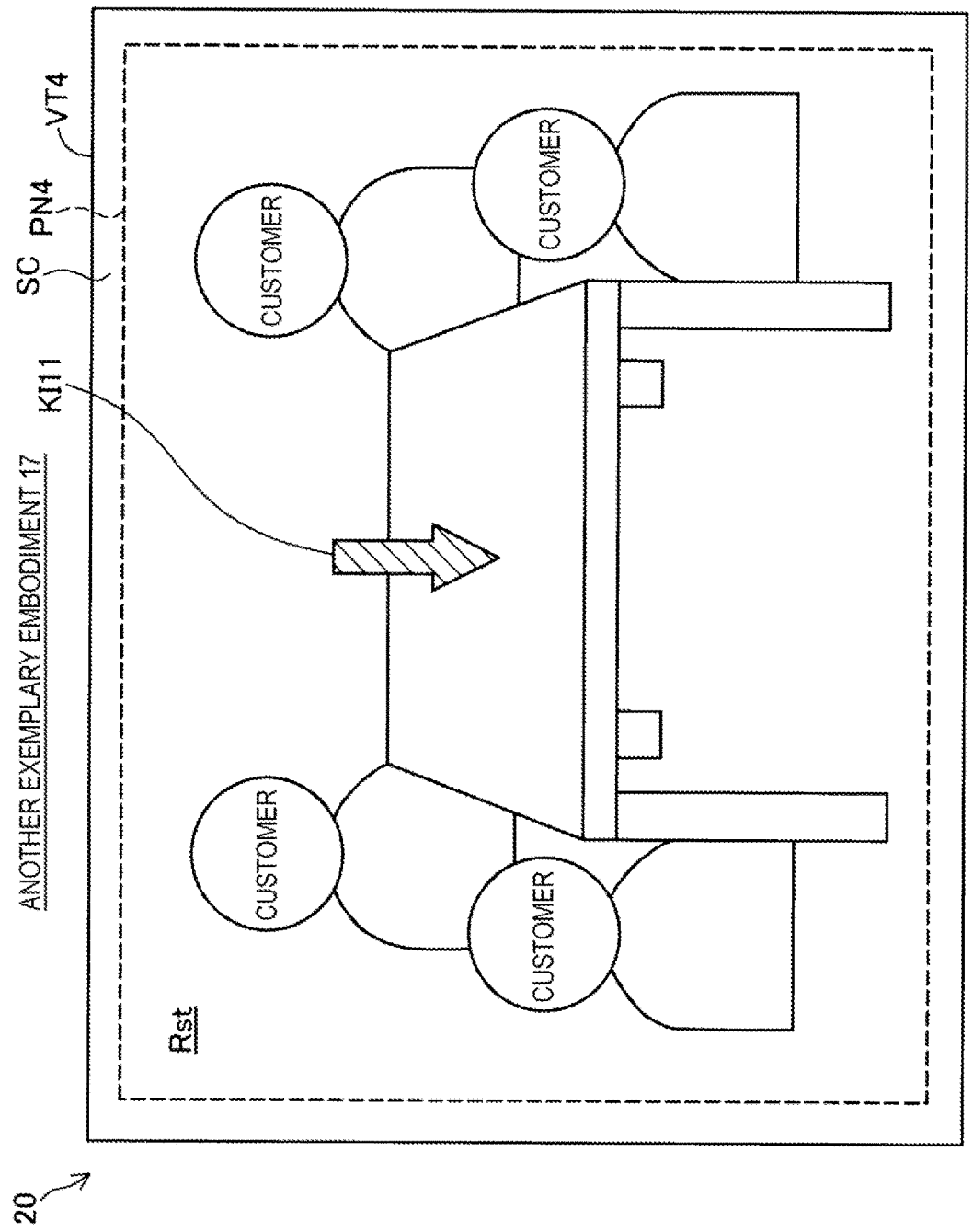
FIG. 20 is an explanatory diagram schematically illustrating the field of view of the first user after the execution of step S125 in another exemplary embodiment 17.

FIG. 20 is an explanatory diagram schematically illustrating a field of view VT4 of a first user US1 after execution of step S125 in another exemplary embodiment 17. In an example illustrated in FIG. 20, the field of view VT4 is illustrated in a case where the "take order" task occurs as a first task. In FIG. 20, as in FIG. 13, the first image display unit 20 of the first HMD 100 is illustrated. As illustrated in FIG. 20, situation inside the eating establishment Rst is reflected on the external scene SC in the field of view VT4, and a related information image KI11 is displayed on a display region PN4. The related information image KI11 is an image denoting an occurrence place of the first task by an arrow. Note that, the occurrence place of the first task can be located by utilizing known techniques such as a Bluetooth (trade name) beacon, an AR marker, and radio field intensity of Wi-Fi (trade name). A reason why the related information image KI11 is superimposed and displayed on a real space is that the occurrence place of the first task, and the target of the task can be presented more comprehensibly to the first user US1. Note that, in addition to the related information image KI11, a related information image indicating a target of the task, a state of the target, a load of the task, a skill level for the task, or the like may be displayed to such an extent that the field of view of the first user US1 is not blocked. Such a configuration also produces effects similar to the effects of the exemplary embodiments described above.

D18. Another Exemplary Embodiment 18

In each of the above-mentioned exemplary embodiments, the support system is applied to the operation support in the eating establishment and the rental video shop. However, the present disclosure is not limited to this. For example, the support system may be applied to a conference of intellectual and collaborative work, collaborative learning, collaborative work for solving problems, practice for electronic sports, and the like. In the practice for electronic sports, for example, by predetermining a player of a user's team as a target of the task, and specifying a line-of-sight of this player as a state of the target, practice for pass timing may be performed, or by predetermining a player of an opponent team as a target of the task, and specifying a movement of this player (positional change) as a state of the target, the best movement of the user may be practiced. Such a configuration also produces effects similar to the effects of the exemplary embodiments described above.

D19. Another Exemplary Embodiment 19

In the above-mentioned first exemplary embodiment and the second exemplary embodiment, the state of the target is identified by detecting the line-of-sight of the target of the task in the captured image, but the present disclosure is not limited to this. For example, instead of detecting the line-of-sight, or in addition to detecting the line-of-sight, the state of the target may be identified by applying pattern matching to the captured image. In this case, the state of the target may be identified by identifying change in the target for a predetermined period of time. Additionally, for example, by cutting out a still image for each predetermined period of time from moving image data, and by applying the pattern matching to a target in the still image, the state of the target may be identified. Such a configuration also produces effects similar to the effects of the exemplary embodiments described above.

D20. Another Exemplary Embodiments 20

In each of the above-mentioned exemplary embodiments, the various data related to the tasks (hereinafter, referred to as "task data") are stored in the task data storage unit 125. However, the present disclosure is not limited to this. For example, the task data may be acquired via the wireless communication unit 117. Specifically, the task data may be acquired from a smartphone of a user of the HMD 100, a server apparatus, or the like. In this configuration, by utilizing the task data acquired via the wireless communication unit 117, the target of the task, the state of the target, the occurrence of the task, or the like may be identified. Additionally, by utilizing both the task data stored in the task data storage unit 125 and the task data acquired via the wireless communication unit 117, the target of the task, the state of the target, the occurrence of the task, or the like may be identified. Such a configuration also produces effects similar to the effects of the exemplary embodiments described above.

D21. Another Exemplary Embodiments 21

In each of the above-mentioned exemplary embodiments, the first task occurrence determination unit, instead of the state of the target in the captured image, or in addition to the state of the target in the captured image, by utilizing a detection result of a sensor configured to acquire external information, may identify the occurrence of the first task. The "sensor configured to acquire external information" means a sensor capable of detecting the state of the target, via at least any one of the five senses such as eyesight, smell, or hearing of a user of the HMD 100. For example, a microphone 63 may be used as the sensor configured to acquire the external information. In this case, when, as a voice input to the microphone 63, a voice calling "excuse me" from a customer as a target of the task, or a voice calling "please help me" from a restaurant staff chief as a target of the task is detected, the first task may be determined to occur. Additionally, for example, the HMD 100 may be configured to include thermography, and this thermography may be used as the sensor configured to acquire the external information. Specifically, when temperature of food or drink is detected with the thermography, and the temperature is lower than predetermined temperature, the first task may be determined to occur. It is because a "serve dishes" task can be performed before dishes get cold in the above manner. Such a configuration also produces effects similar to the effects of the exemplary embodiments described above.

The present disclosure is not limited to the exemplary embodiments described above. Rather, the present disclosure can be achieved in various configurations, to an extent that such configurations fall within the scope of the present disclosure. For example, technical features of the exemplary embodiments, which correspond to the technical features of the embodiments described in the summary of the disclosure, may be appropriately replaced or combined to address some or all of the above-identified problems or to achieve some or all of the above-described advantages. Any of the technical features may be deleted as appropriate unless the technical feature is described in the specification as indispensable.

E. Other Embodiments (1) According to an exemplary embodiment of the present disclosure, a transmissive head mounted display apparatus is provided. This transmissive head mounted display apparatus includes an image display unit configured to transmit an external scene and display an image of a display target viewable with the external scene, an imaging unit, a target identifying unit configured to identify, from a captured image captured by the imaging unit, a target of a task predetermined as a task that a user of the transmissive head mounted display apparatus needs to perform, a task occurrence determination unit configured to determine, based on a state of the target in the captured image, whether the task has occurred or not, and a display controller configured to cause the image display unit to display related information relating to the task in a case where the task is determined to have occurred.

According to the transmissive head mounted display apparatus of this embodiment, the target of the task that the user needs to perform is identified from the captured image, based on the state of the target in the captured image, whether the task occurs or not is determined, the related information is displayed when the task is determined to have occurred, and thus the user can easily recognize that the task occurs.

(2) The transmissive head mounted display apparatus of the above embodiment may further include a communication unit, and a related information providing unit configured to provide the related information via the communication unit when the task is determined to have occurred. According to the transmissive head mounted display apparatus of this embodiment, since the related information is provided via the communication unit when the task is determined to have occurred, a user of an apparatus different from the transmissive head mounted display apparatus can easily acquire the related information.

(3) The transmissive head mounted display apparatus of the above embodiment may further include a line-of-sight detector configured to detect a line-of-sight of the target in the captured image, in which, the task occurrence determination unit may be configured to, in a state where the target is looking at the user, determine that the task has occurred. According to the transmissive head mounted display apparatus of this embodiment, a line-of-sight of the target in the captured image is detected, in a state where the target is looking at the user, the task is determined to have occurred, and thus whether the task occurs or not can easily be determined.

(4) The transmissive head mounted display apparatus of the above embodiment may further include a target position locating unit configured to locate a position of the target, and a user position locating unit configured to locate a position of the user, in which, the task occurrence determination unit may be configured to, in a state where the target is separated from the user by a distance equal to or greater than a predetermined distance, determine that the task has not occurred. According to the transmissive head mounted display apparatus of this embodiment, in a state where the target is separated from the user by equal to or more than the predetermined distance, the task is determined not to occur, and thus whether the task occurs or not can be determined precisely.

(5) The transmissive head mounted display apparatus of the above embodiment may further include a target position locating unit configured to locate a position of the target, in which the related information may include information indicating a position of the target. According to the transmissive head mounted display apparatus of this embodiment, the related information includes the information indicating the position of the target, and thus time and effort for the user to look for the target can be reduced.

(6) According to another exemplary embodiment of the present disclosure, a support system is provided. This support system includes a plurality of transmissive head mounted display apparatuses including a first transmissive head mounted display apparatus configured to be worn by a first user, and one or more second transmissive head mounted display apparatuses configured to be worn by one or more second users different from the first user, in which the first transmissive head mounted display apparatus includes a first image display unit configured to transmit an external scene and display an image of a display target viewable with the external scene, a first communication unit, an imaging unit, a target identifying unit configured to identify, from a captured image captured by the imaging unit, a target of a first task predetermined as a task that the first user needs to perform, a first task occurrence determination unit configured to determine, based on a state of the target in the captured image, whether the first task has occurred or not, a first display controller configured to cause the first image display unit to display first related information relating to the task, when the first task is determined to have occurred, and a related information providing unit configured to provide the first related information via the first communication unit, when the first task is determined to have occurred, the second transmissive head mounted display apparatus includes, a second image display unit configured to transmit the external scene and display an image of a display target viewable with the external scene, a second communication unit, a first related information acquisition unit configured to acquire the first related information via communication by the second communication unit, and a second display controller configured to cause the second image display unit to display the acquired first related information.

According to the support system of this embodiment, when the first task is determined to have occurred in the first transmissive head mounted display apparatus, the first related information is displayed and provided in the first transmissive head mounted display apparatus, and the acquired first related information is displayed in the second transmissive head mounted display apparatus, and thus a user of the first transmissive head mounted display apparatus and a user of the second transmissive head mounted display apparatus can easily recognize that the first task occurs.

(7) In the support system of the above embodiment, the first transmissive head mounted display apparatus may include a target position locating unit configured to locate a position of the target, an operation detector configured to detect an operation of the first user, and a first task completion determination unit configured to determine whether the first task has been completed or not, in which the first task completion determination unit may be configured to, when an operation of the first user at a position of the target, which has been located, is an operation identical to a predetermined operation, determine that the first task has been completed.

According to the support system of this embodiment, when the operation of the first user at the located position of the target is identical to the predetermined operation, the first task is determined to be completed, and thus whether the first task is completed or not can easily be determined.

(8) In the support system of the above embodiment, the first transmissive head mounted display apparatus may further include a second task occurrence determination unit configured to determine whether a second task has occurred or not, the second task being a task that the second user needs to perform and that is different from the first task, in which the second task occurrence determination unit may be configured to, when the first task is determined not to have been completed, determine that the second task has occurred.

According to the support system of this embodiment, when the first task is determined not to be completed, the second task is determined to have occurred, and thus whether the second task occurs or not can be determined easily and precisely.

(9) The support system of the above embodiment may include a plurality of the second transmissive head mounted display apparatuses configured to be worn by a plurality of the second users, in which the first transmissive head mounted display apparatus may further include a position acquisition unit configured to acquire a position of each of the second users via communication by the first communication unit, a load condition acquisition unit configured to acquire a load condition of each of the second users via communication by the first communication unit, and a performer determination unit configured to determine a performer of a second task, which is the task that any second user among the plurality of the second users needs to perform and that is different from the first task, and the performer determination unit may be configured to determine the performer, the determination being made based on the acquired position of each of the second users and the acquired load condition of each of the second users.

According to the support system of this embodiment, the performer is determined based on the acquired position of each of the second users and the acquired load condition of each of the second users, and thus an appropriate user can be determined as a performer within the support system.

(10) In the support system of the above embodiment, the performer determination unit may be configured to utilize predetermined priority of the second task and a predetermined skill level of each of the second users to determine the performer. According to the support system of this embodiment, the performer is determined by utilizing the predetermined priority of the second task and the predetermined skill level of each of the second users, and thus an appropriate user can be determined as a performer according to a place to perform a task and a skill level of a user.

(11) In the support system of the above embodiment, the second transmissive head mounted display apparatus may further include a second related information acquisition unit configured to acquire second related information relating to the second task via communication by the second communication unit, the second display controller may be configured to cause the second image display unit to display the acquired second related information. According to the support system of this embodiment, since the second image display unit is allowed to display the second related information, the performer of the second task is allowed to know the second related information.

(12) In the support system of the above embodiment, the second display controller may be configured to cause the second related information to be displayed differently, depending on the skill level of the performer for the second task. According to the support system of this embodiment, since the second related information is displayed differently according to the skill level for the second task of the performer, more second related information can be displayed for a performer with a low skill level for the second task, or less second related information can be displayed for a performer with a high skill level for the second task, and thus appropriate information can be displayed for the performer of the second task.

The present disclosure may be achieved in various embodiments. For example, the present disclosure can be achieved in embodiments such as a display control method, a support system, a computer program for implementing functions for the method and the system, a recording medium in which the computer program is recorded, and the like, in a transmissive head mounted display apparatus.

What is claimed is:

1. A transmissive head mounted display apparatus, comprising:
a display, configured to transmit an external scene and display an image of a display target viewable with the external scene;
a camera;
a processor, configured to:
identify, from a captured image captured by the camera, a target of a task predetermined as a task that a user of the transmissive head mounted display apparatus needs to perform;
determine, based on a state of the target in the captured image, whether the task has occurred or not, wherein the task is determined to have occurred when the target is looking at the user for a predetermined time period;
cause the display to display related information relating to the task when the task is determined to have occurred, wherein the related information includes information indicating a position of the target;
determine whether the task is completed within another predetermined time period; and
in response to the task not being completed within another predetermined time period,
determine that another task has occurred,
acquire a position of each of a plurality of other users of a plurality of other transmissive head mounted display apparatuses,
acquire a load condition of each of the other users, and
determine a performer of the task among the plurality of other users based on the acquired position of each of the other users and the acquired load condition of each of the other users.

2. The transmissive head mounted display apparatus according to claim 1, further comprising:
an I/O interface,
wherein the processor is further configured to provide the related information via the I/O interface when the task is determined to have occurred.

3. The transmissive head mounted display apparatus according to claim 1, wherein the processor is further configured to detect a line-of-sight of the target in the captured image.

4. The transmissive head mounted display apparatus according to claim 1, wherein the processor is further configured to:
locate a position of the target;
locate a position of the user;
in a state where the target is separated from the user by a distance equal to or greater than a predetermined distance, determine that the task has not occur.

5. The transmissive head mounted display apparatus according to claim 1, wherein the processor is further configured to locate the position of the target.

6. A support system, comprising a plurality of transmissive head mounted display apparatuses including,
  a first transmissive head mounted display apparatus configured to be worn by a first user and
  a plurality of second transmissive head mounted display apparatuses configured to be worn by a plurality of second users different from the first user, wherein
  the first transmissive head mounted display apparatus includes,
  a first display configured to transmit an external scene and display an image of a display target viewable with the external scene,
  a first I/O interface,
  a first camera,
  a first processor, configured to:
    identify, from a captured image captured by the first camera, a target of a first task predetermined as a task that the first user needs to perform;
    determine, based on a state of the target in the captured image, whether the first task has occurred or not, wherein the first task is determined to have occurred when the target is looking at the first user for a predetermined time period;
    cause the first display to display first related information relating to the task, when the first task is determined to have occurred, wherein the first related information includes information indicating a position of the target; and
    provide the first related information via the first I/O interface, when the first task is determined to have occurred;
    determine whether the first task is completed within another predetermined time period; and
    in response to the task not being completed within the another predetermined time period, determine that a second task has occurred, acquire a position of each of the second users via communication by the first I/O interface, acquire the load condition of each of the second users via communication by the first I/O interface, and determine a performer of the second task among the plurality of the second users based on the acquired position of each of the second users and the acquired load condition of each of the second users, and
  each of the second transmissive head mounted display apparatuses includes,
  a second display configured to transmit the external scene and display an image of a display target viewable with the external scene,
  a second I/O interface,
  a second processor, configured to:
    acquire the first related information via communication by the second I/O interface, and
    cause the second display to display the acquired first related information.

7. The support system according to claim 6, wherein the first processor is further configured to:
  locate a position of the target;
  detect an operation of the first user;
  determine whether the first task has been completed or not; and
  when an operation of the first user at a position of the target, which has been located, is an operation identical to a predetermined operation, determine that the first task has been completed.

8. The support system according to claim 6, wherein
  the first processor is configured to utilize predetermined priority of the second task and a predetermined skill level of each of the second users to determine the performer.

9. The support system according to claim 6, wherein the second processor of each of the plurality of the second transmissive head mounted display apparatuses is further configured to:
  acquire second related information relating to the second task via communication by the second I/O interface; and
  cause the second display to display the acquired second related information.

10. The support system according to claim 9, wherein
  the second processor of each of the plurality of the second transmissive head mounted display apparatuses is configured to cause the second related information to be displayed differently, depending on a skill level of the performer for the second task.

11. A display control method for a transmissive head mounted display apparatus including a display configured to transmit an external scene and display an image of a display target viewable with the external scene, and a camera, the method comprising:
  identifying, from a captured image captured by the camera, a target of a task predetermined as a task that a user of the transmissive head mounted display apparatus needs to perform;
  determining, based on a state of the target in the captured image, whether the task has occurred or not, wherein the task is determined to have occurred when the target is looking at the user for a predetermined time period;
  causing the display to display related information relating to the task when the task is determined to have occurred, wherein the related information includes information indicating a position of the target;
  determining whether the task is completed within another predetermined time period; and
  in response to the task not being completed within the another predetermined time period,
  determine that another task has occurred,
  acquiring a position of each of a plurality of other users of a plurality of other transmissive head mounted display apparatuses,
  acquiring a load condition of each of the other users, and
  determining a performer of the task among the plurality of other users based on the acquired position of each of the other users and the acquired load condition of each of the other users.

12. A non-transitory computer-readable storage medium storing a computer program for implementing display control in a transmissive head mounted display apparatus including a display configured to transmit an external scene and display an image of a display target viewable with the external scene, and a camera, the computer program causing a computer to implement functions comprising:
  a function to identify, from a captured image captured by the camera, a target of a task predetermined as a task that a user of the transmissive head mounted display apparatus needs to perform;
  a function to determine, based on a state of the target in the captured image, whether the task has occurred or not, wherein the task is determined to have occurred when the target is looking at the user for a predetermined time period;

a function to cause the display to display related information relating to the task when the task is determined to have occurred, wherein the related information includes information indicating a position of the target;
a function to determine whether the task is completed within another predetermined time period; and
a function to determine that another task has occurred, acquire a position of each of a plurality of other users of a plurality of other transmissive head mounted display apparatuses, acquire a load condition of each of the other users, and determine a performer of the task among the plurality of other users based on the acquired position of each of the other users and the acquired load condition of each of the other users in response to the task not being completed within the another predetermined time period.

* * * * *